(12) United States Patent
Page et al.

(10) Patent No.: US 11,439,943 B2
(45) Date of Patent: Sep. 13, 2022

(54) INTERRUPTED, DIRECTIONAL EMBOSS OF FLAT SHEET

(71) Applicant: Cummins Filtration IP, Inc., Columbus, IN (US)

(72) Inventors: Emmanuel Page, Tremeoc (FR); Anthony Barreteau, Quimper (FR); Kurt M. A. Badeau, Evansville, WI (US); Christopher E. Holm, Madison, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 660 days.

(21) Appl. No.: 16/343,076

(22) PCT Filed: Oct. 16, 2017

(86) PCT No.: PCT/US2017/056744
§ 371 (c)(1),
(2) Date: Apr. 18, 2019

(87) PCT Pub. No.: WO2018/075385
PCT Pub. Date: Apr. 26, 2018

(65) Prior Publication Data
US 2019/0329170 A1 Oct. 31, 2019

Related U.S. Application Data

(60) Provisional application No. 62/410,529, filed on Oct. 20, 2016.

(51) Int. Cl.
*B01D 46/52* (2006.01)
*B01D 46/00* (2022.01)
(Continued)

(52) U.S. Cl.
CPC ....... *B01D 46/522* (2013.01); *B01D 46/0005* (2013.01); *B01D 46/523* (2013.01);
(Continued)

(58) Field of Classification Search
CPC B01D 46/0001; B01D 46/0002; B01D 46/10; B01D 46/522; B01D 46/525–527;
(Continued)

(56) References Cited

U.S. PATENT DOCUMENTS 3,293,833 A 12/1966 Barany
3,410,062 A 11/1968 Hart
(Continued)

FOREIGN PATENT DOCUMENTS

CN 2126622 1/1993
CN 101060914 10/2007
(Continued)

OTHER PUBLICATIONS

First Examination Report for Indian Patent App. No. 809/KOLNP/2012 dated Oct. 8, 2018, 6 pages.
(Continued)

*Primary Examiner* — Robert Clemente
(74) *Attorney, Agent, or Firm* — Foley & Lardner LLP

(57) ABSTRACT

Filter media having a design embossed into the media are described. In some arrangements, the filter media is pleated filter media. In other arrangements, the filter media includes a plurality of channels, such as tetrahedron channels. The filter media includes a pattern of interrupted straight or angled embossments that help maintain separation between adjacent layers of the filter media. The embossments allow for two adjacent media layers (e.g., mating surfaces of the filter media) to remain separated, thereby increasing dust holding capacity and lowering pressure drop over similarly configured filter media not having the embossments.

17 Claims, 14 Drawing Sheets

(51) Int. Cl.
*B32B 3/28* (2006.01)
*B01D 46/58* (2022.01)

(52) U.S. Cl.
CPC ........... *B01D 46/525* (2013.01); *B01D 46/58* (2022.01); *B32B 3/28* (2013.01); *B01D 2275/10* (2013.01); *B01D 2279/60* (2013.01); *B32B 2250/02* (2013.01); *B32B 2307/724* (2013.01)

(58) Field of Classification Search
CPC ............ B01D 2267/40; B01D 2279/60; B01D 46/521; B01D 46/523; B01D 2275/10; B32B 3/28; B32B 2250/02; B32B 2307/724
See application file for complete search history.

(56) References Cited

U.S. PATENT DOCUMENTS

| | | | |
|---|---|---|---|
| 3,921,432 A | 11/1975 | Rivers | |
| 4,144,043 A | 3/1979 | Johnston | |
| 4,177,050 A | 12/1979 | Culbert et al. | |
| 4,235,611 A | 11/1980 | Brownell | |
| 4,268,290 A | 5/1981 | Barrington | |
| 4,410,427 A | 10/1983 | Wydeven | |
| 4,498,915 A | 2/1985 | Witchell | |
| 4,528,008 A | 7/1985 | Takagi et al. | |
| 4,589,983 A | 5/1986 | Wydevan | |
| 4,925,561 A | 5/1990 | Ishii et al. | |
| 5,167,740 A | 12/1992 | Michaelis et al. | |
| 5,316,677 A | 5/1994 | Harms, II | |
| 5,320,657 A | 6/1994 | Adams | |
| 5,557,808 A | 9/1996 | Kawai | |
| 5,558,689 A | 9/1996 | Yanagihara et al. | |
| 5,814,117 A | 9/1998 | Mochida | |
| 5,980,759 A | 11/1999 | Proulx et al. | |
| 6,000,685 A | 12/1999 | Groten et al. | |
| 6,165,242 A | 12/2000 | Choi | |
| 6,238,561 B1 | 5/2001 | Liu et al. | |
| 6,273,938 B1 | 8/2001 | Fanselow et al. | |
| 6,391,076 B1 | 5/2002 | Jaroszczyk et al. | |
| 6,544,310 B2 | 4/2003 | Badeau et al. | |
| 6,582,490 B2 | 6/2003 | Miller et al. | |
| 6,598,749 B2 | 7/2003 | Paul et al. | |
| 6,656,243 B2 | 12/2003 | Hodge | |
| 6,746,500 B1 | 6/2004 | Park et al. | |
| 6,932,850 B1 | 8/2005 | Welch et al. | |
| 7,311,747 B2 | 12/2007 | Adamek et al. | |
| 7,314,558 B1 | 1/2008 | Jaroszczyk et al. | |
| 7,323,105 B1 | 1/2008 | Janikowski et al. | |
| 7,323,106 B2 | 1/2008 | Jaroszczyk et al. | |
| 7,425,227 B1 | 9/2008 | Hutchison et al. | |
| 7,488,365 B2 | 2/2009 | Golden et al. | |
| 7,497,886 B2 | 3/2009 | Walker | |
| 7,534,279 B2 | 5/2009 | Oh et al. | |
| 7,552,506 B2 | 6/2009 | Lee et al. | |
| 7,588,619 B2 | 9/2009 | Chilton et al. | |
| 7,625,418 B1 | 12/2009 | Choi | |
| 7,648,546 B2 | 1/2010 | Haberkamp et al. | |
| 7,736,408 B2 | 6/2010 | Bock et al. | |
| 7,779,507 B2 | 8/2010 | Jung et al. | |
| 7,797,790 B2 | 9/2010 | Park et al. | |
| 7,815,703 B2 | 10/2010 | Park | |
| 7,879,125 B2 | 2/2011 | Haberkamp et al. | |
| 7,883,572 B2 | 2/2011 | Neudeck | |
| 7,922,006 B2 | 4/2011 | Fall et al. | |
| 7,931,723 B2 | 4/2011 | Cuvelier | |
| 8,075,720 B2 | 12/2011 | Fall et al. | |
| 8,276,605 B2 | 10/2012 | Heathcote et al. | |
| 8,397,920 B2 | 3/2013 | Moy et al. | |
| 8,491,689 B2 | 7/2013 | Duffy et al. | |
| 8,545,658 B2 | 10/2013 | Spearin et al. | |
| 8,615,844 B2 | 12/2013 | Van Raalte et al. | |
| 8,728,188 B2 | 5/2014 | Kim et al. | |
| 8,852,310 B2 | 10/2014 | Holzmann et al. | |
| 8,888,885 B2 | 11/2014 | Barreteau et al. | |
| 9,038,235 B2 | 5/2015 | Van Der Kooi et al. | |
| 9,061,234 B2 | 6/2015 | Lundquist | |
| 9,180,396 B2 | 11/2015 | Maruyama | |
| 9,370,742 B2 | 6/2016 | Edwards et al. | |
| 9,457,307 B2 | 10/2016 | Kaufmann et al. | |
| 9,504,950 B2 | 11/2016 | Holzmann et al. | |
| 9,808,753 B2 | 11/2017 | Lise et al. | |
| 10,786,774 B2 | 9/2020 | Rocklitz et al. | |
| 2005/0072131 A1 | 4/2005 | Tate et al. | |
| 2006/0091084 A1 | 5/2006 | Merritt et al. | |
| 2006/0272305 A1 | 12/2006 | Morgan | |
| 2007/0011996 A1 | 1/2007 | Tsuchiya et al. | |
| 2007/0056691 A1 | 3/2007 | Lin | |
| 2007/0102101 A1 | 5/2007 | Spearin et al. | |
| 2007/0130895 A1 | 6/2007 | Boeck et al. | |
| 2007/0186528 A1 | 8/2007 | Wydeven et al. | |
| 2007/0209343 A1 | 9/2007 | Cuvelier | |
| 2007/0262016 A1 | 11/2007 | Fall et al. | |
| 2007/0294856 A1 | 12/2007 | Park | |
| 2008/0000827 A1 | 1/2008 | Bruss | |
| 2008/0010957 A1 | 1/2008 | Yun et al. | |
| 2008/0011673 A1 | 1/2008 | Janikowski et al. | |
| 2008/0104795 A1 | 5/2008 | Lang | |
| 2008/0120952 A1* | 5/2008 | Chilton | B01D 46/528 55/488 |
| 2008/0282890 A1 | 11/2008 | Rocklitz et al. | |
| 2009/0032469 A1 | 2/2009 | Panzani et al. | |
| 2009/0056753 A1 | 3/2009 | Heathcote et al. | |
| 2009/0133212 A1 | 5/2009 | Morishita et al. | |
| 2009/0178232 A1 | 7/2009 | Hyun et al. | |
| 2009/0183338 A1 | 7/2009 | Van Raalte et al. | |
| 2009/0217820 A1 | 9/2009 | Neudeck | |
| 2009/0293224 A1 | 12/2009 | Hyun et al. | |
| 2010/0018173 A1 | 1/2010 | Park et al. | |
| 2010/0206173 A1 | 8/2010 | Oh | |
| 2010/0269463 A1 | 10/2010 | Duffy et al. | |
| 2011/0152054 A1 | 6/2011 | Fall et al. | |
| 2011/0186504 A1 | 8/2011 | Rocklitz | |
| 2011/0197556 A1* | 8/2011 | Brown | B01D 46/0002 55/498 |
| 2011/0252759 A1 | 10/2011 | Nicholas | |
| 2012/0047858 A1 | 3/2012 | Kim et al. | |
| 2012/0055127 A1 | 3/2012 | Holzmann et al. | |
| 2012/0118814 A1* | 5/2012 | Moy | B01D 46/522 210/493.1 |
| 2012/0180664 A1 | 7/2012 | Lundquist | |
| 2012/0233807 A1 | 9/2012 | Van Der Kooi et al. | |
| 2013/0062276 A1 | 3/2013 | Barreteau et al. | |
| 2013/0189081 A1 | 7/2013 | Bryant et al. | |
| 2013/0306547 A1 | 11/2013 | Norris | |
| 2014/0014597 A1 | 1/2014 | Knight et al. | |
| 2014/0130467 A1 | 5/2014 | Herman et al. | |
| 2014/0137524 A1 | 5/2014 | Jarrier | |
| 2014/0165839 A1 | 6/2014 | Crabtree | |
| 2014/0209528 A1 | 7/2014 | Eleftherakis et al. | |
| 2014/0209529 A1 | 7/2014 | Eleftherakis et al. | |
| 2014/0235419 A1 | 8/2014 | Lise et al. | |
| 2014/0260132 A1 | 9/2014 | Maruyama | |
| 2014/0260138 A1 | 9/2014 | Edwards et al. | |
| 2015/0013290 A1 | 1/2015 | Holzmann et al. | |
| 2015/0047304 A1 | 2/2015 | Son | |
| 2015/0059301 A1 | 3/2015 | Kaufmann et al. | |
| 2015/0165348 A1 | 6/2015 | Lo | |
| 2015/0165352 A1 | 6/2015 | Lang | |
| 2015/0165362 A1 | 6/2015 | Canfield et al. | |
| 2015/0211452 A1 | 7/2015 | Brown | |
| 2015/0251111 A1 | 9/2015 | Savstrom et al. | |
| 2015/0305583 A1 | 10/2015 | Jonsson | |
| 2015/0315544 A1 | 11/2015 | Hamman | |
| 2016/0016100 A1 | 1/2016 | Mouanda | |
| 2016/0067647 A1 | 3/2016 | Tate et al. | |
| 2016/0193714 A1 | 7/2016 | Machama et al. | |
| 2016/0214053 A1 | 7/2016 | Schwartz | |
| 2016/0219954 A1 | 8/2016 | Nakamura | |
| 2016/0265436 A1 | 9/2016 | Bryant et al. | |
| 2016/0296773 A1 | 10/2016 | Lin | |
| 2017/0028339 A1 | 2/2017 | Savstrom | |

(56) References Cited

U.S. PATENT DOCUMENTS

| | | |
|---|---|---|
| 2017/0056793 A1 | 3/2017 | Klein et al. |
| 2017/0056807 A1 | 3/2017 | Klein et al. |
| 2017/0065924 A1 | 3/2017 | Holzmann et al. |
| 2017/0197165 A1 | 7/2017 | Schwartz et al. |
| 2017/0216757 A1 | 8/2017 | Ouyang et al. |
| 2017/0234221 A9 | 8/2017 | Bryant et al. |
| 2017/0259216 A1 | 9/2017 | Madhavaram et al. |
| 2017/0266617 A1 | 9/2017 | Difrancesco et al. |
| 2019/0046915 A1 | 2/2019 | Gieseke et al. |
| 2019/0329170 A1 | 10/2019 | Page et al. |
| 2020/0078721 A1 | 3/2020 | Ouyang et al. |

FOREIGN PATENT DOCUMENTS

| | | |
|---|---|---|
| CN | 101534923 A | 9/2009 |
| CN | 101626820 | 1/2010 |
| CN | 103796726 A | 5/2014 |
| DE | 103 09 661 A1 | 9/2004 |
| DE | 10 2015 007 659 | 12/2015 |
| EP | 1 254 689 | 11/2002 |
| GB | 2 131 717 A | 6/1984 |
| JP | 5333550 B2 | 11/2013 |
| WO | WO-2012/067729 | 5/2012 |
| WO | WO-2013/133865 | 9/2013 |
| WO | WO 2016/019307 | 2/2016 |
| WO | WO-2016/014549 | 3/2016 |
| WO | WO 2016/040332 | 3/2016 |
| WO | WO-2016/077377 A1 | 5/2016 |
| WO | WO-2017/031168 A1 | 2/2017 |
| WO | WO-2017/066169 A1 | 4/2017 |
| WO | WO-2018/191147 A1 | 10/2018 |
| WO | WO-2018/191865 A1 | 10/2018 |
| WO | WO-2019/040324 A1 | 2/2019 |
| WO | WO-2019/060904 A2 | 3/2019 |

OTHER PUBLICATIONS

First Office Action for Chinese Patent App. No. 201410767340.7 dated Nov. 26, 2015, 14 pages (with translation).
International Search Report & Written Opinion for PCT/US2011/054924 dated Jan. 23, 2012, 9 pages.
International Search Report and Written Opinion issued for PCT/US2017/056744, dated Feb. 13, 2018, 15 pages.
International Search Report and Written Opinion issued for PCT/US2017/065726, dated Feb. 16, 2018, 11 pages.
First Office Action issued for Chinese Patent Application No. 2017800765908, dated Jan. 20, 2021, 13 pages.
International Search Report and Written Opinion for PCT/US2019/031132, dated Jul. 17, 2019, 12 pages.
Partial Search Report issued for European Patent Application No. EP 17862733.7, dated Apr. 17, 2020, 11 pages.
International Search Report and Written Opinion for PCT/US2019/065259 dated Feb. 11, 2020, 15 pages.
Second Office Action issued for Chinese Patent Application No. CN 201780064747.5, dated Jul. 23, 2021, 10 pages.
U.S. Office Action on U.S. Appl. No. 16/468,460 dated Jul. 9, 2021.
Office Action issued for German Patent Application No. DE 112011103785.6 dated Mar. 5, 2021, 19 pages.
EP Extended Search Report on EP19800228.9 dated Dec. 2, 2021 (11 pages).

\* cited by examiner

INTERRUPTED, DIRECTIONAL EMBOSS OF FLAT SHEET

CROSS REFERENCE TO RELATED APPLICATIONS

The present application is a national stage of PCT Application No. PCT/US2017/056744; filed Oct. 16, 2017 which claims the benefit of priority to U.S. Provisional Patent Application No. 62/410,529, filed Oct. 20, 2016. The contents of both applications are incorporated herein by reference in their entirety.

TECHNICAL FIELD

The present application relates to filter media.

BACKGROUND

Internal combustion engines generally combust a mixture of fuel (e.g., gasoline, diesel, natural gas, etc.) and air. Many or all of the fluids passing through the internal combustion engine are filtered to remove particulate and contaminants from the fluids prior to entering the internal combustion engine. For example, prior to entering the engine, intake air is typically passed through a filter element to remove contaminants (e.g., particulates, dust, water, etc.) from the intake air prior to delivery to the engine. The filter media of the filter element captures and removes particulate from the intake air passing through the filter media. As the filter media captures and removes particulate, the restriction of the filter media increases. The filter media has a dust holding capacity that defines the amount of particulate that the filter media can capture without the need for replacement. After the dust holding capacity of the filter media is reached, the filter element may require replacement.

SUMMARY

Various example embodiments relate to filter media, filter elements containing the filter media, and filtration systems having the filter elements. One example embodiment relates to filter media. The filter media includes a first sheet of filter media having a first side and a second side and pleated along a plurality of bend lines to form a plurality of wall segments. The plurality of wall segments comprises a first set of wall segments alternately sealed to each other at the first side to define a first set of tetrahedron channels having open first ends, and a second set of tetrahedron channels interdigitated with the first set of tetrahedron channels and having closed first ends. The plurality of wall segments comprises a second set of wall segments alternately sealed to each other at the second side to define a third set of tetrahedron channels having closed second ends, and a fourth set of tetrahedron channels interdigitated with the third set of tetrahedron channels and having open second ends. The filter media further includes a second sheet of filter media extending across the first sheet of filter media. The second sheet of filter media comprises an embossment that forms a raised surface configured to maintain a gap between the second sheet of filter media and an adjacent sheet of filter media.

Another example embodiment relates to filter media. The filter media includes a flat sheet of filter media that is alternately folded along a plurality of pleat fold lines, thereby defining a pleat block. The flat sheet of filter media comprises a plurality of embossments. Each of the plurality of embossments forms a raised surface that maintains a separation distance between adjacent pleats of the pleat block.

A further example embodiment relates to a filtration system. The filtration system includes a housing body. The housing body includes a housing outlet, a housing inlet, and a central compartment. A filter element is installed in the central compartment. The filter element includes filter media. The filter media includes a first sheet of filter media having an upstream inlet adjacent the housing inlet, a downstream outlet adjacent the housing outlet, and is pleated along a plurality of bend lines to form a plurality of wall segments. The plurality of wall segments comprises a first set of wall segments alternately sealed to each other at the upstream inlet to define a first set of tetrahedron channels having open upstream ends, and a second set of tetrahedron channels interdigitated with the first set of tetrahedron channels and having closed upstream ends. The plurality of wall segments comprises a second set of wall segments alternately sealed to each other at the downstream outlet to define a third set of tetrahedron channels having open downstream ends, and a fourth set of tetrahedron channels interdigitated with the third set of tetrahedron channels and having closed downstream ends. The filter media further includes a second sheet of filter media extending across the first sheet of filter media. The second sheet of filter media comprises an embossment that forms a raised surface configured to maintain a gap between the second sheet of filter media and an adjacent sheet of filter media.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, filter media having a design embossed into the media are described. In some arrangements, the filter media is pleated filter media. In other arrangements, the filter media includes a plurality of channels, such as tetrahedron channels. The filter media includes a pattern of interrupted straight or angled embossments that help maintain separation between adjacent layers of the filter media. The embossments allow for two adjacent media layers (e.g., mating surfaces of the filter media) to remain separated, thereby increasing dust holding capacity and lowering pressure drop over similarly configured filter media not having the embossments.

Figure 1:
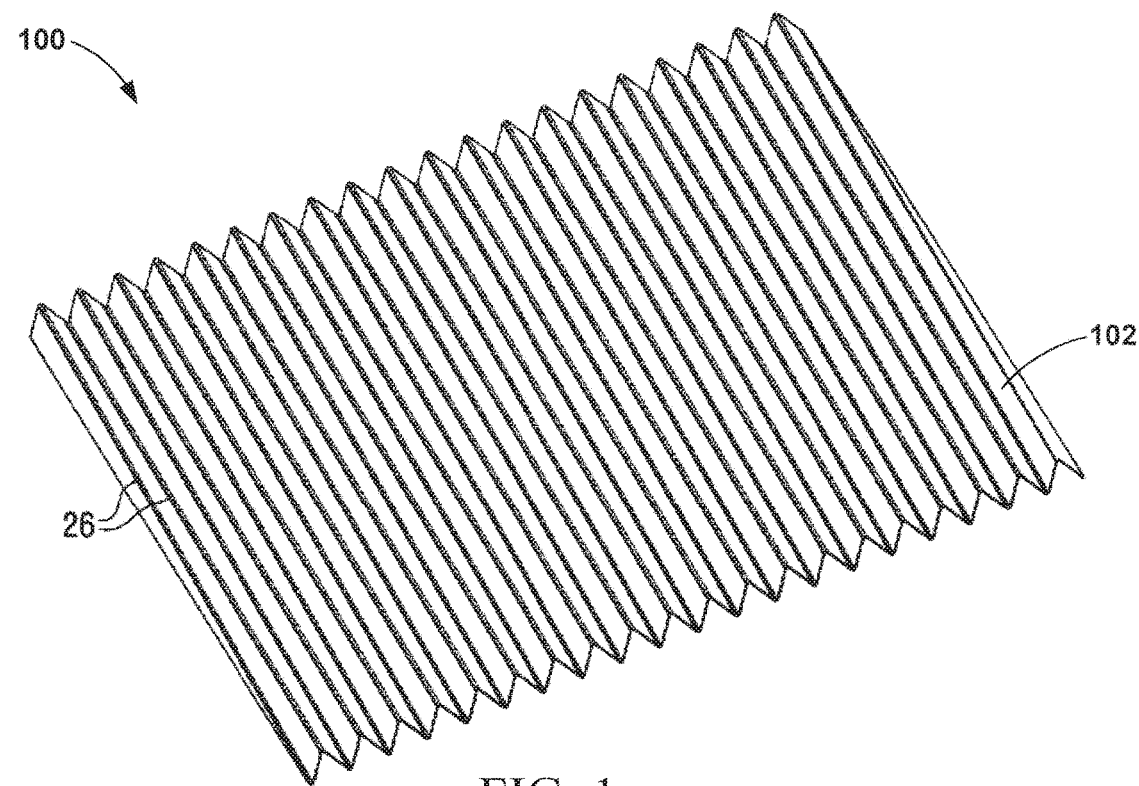
FIG. 1 shows a perspective view of a folded filter media sheet of filter media according to an example embodiment.
Figure 2:
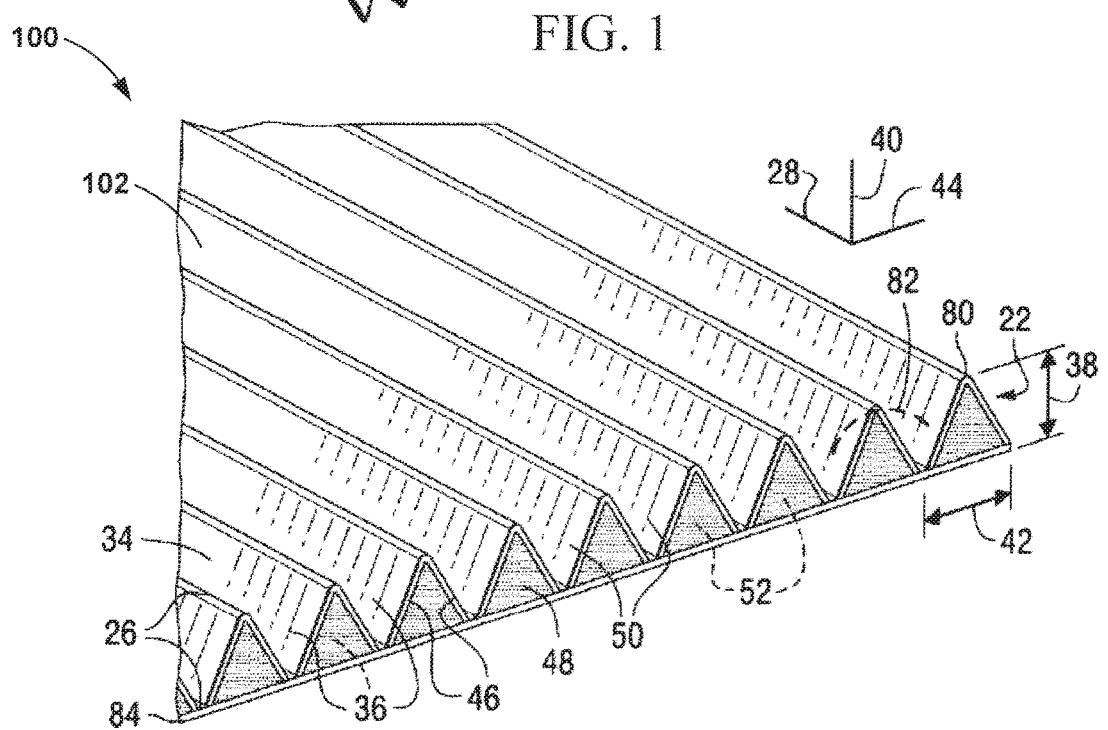
FIG. 2, FIG. 3, and FIG. 4 each show a different perspective view of the filter media of FIG. 1.
Figure 3:
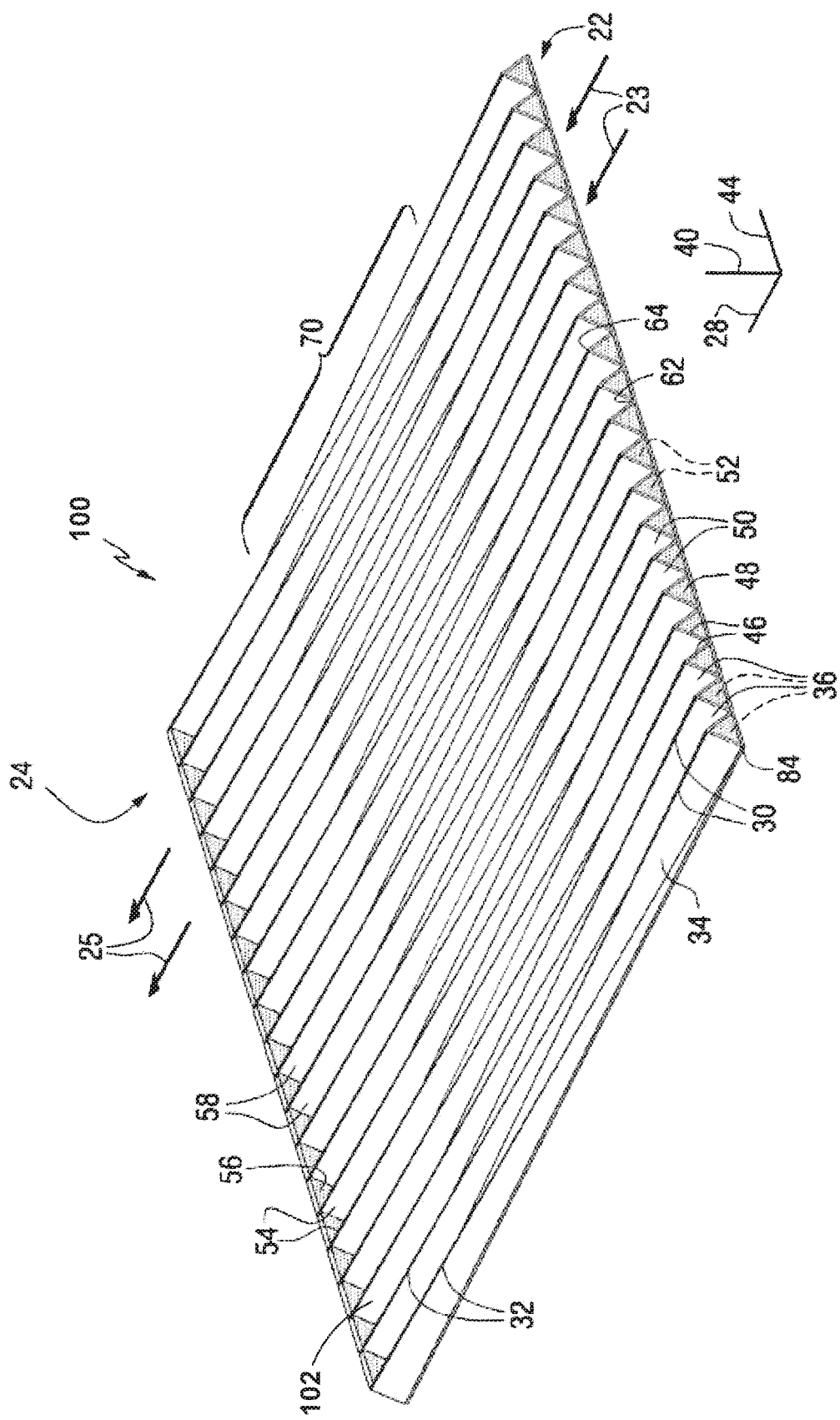
Figure 4:
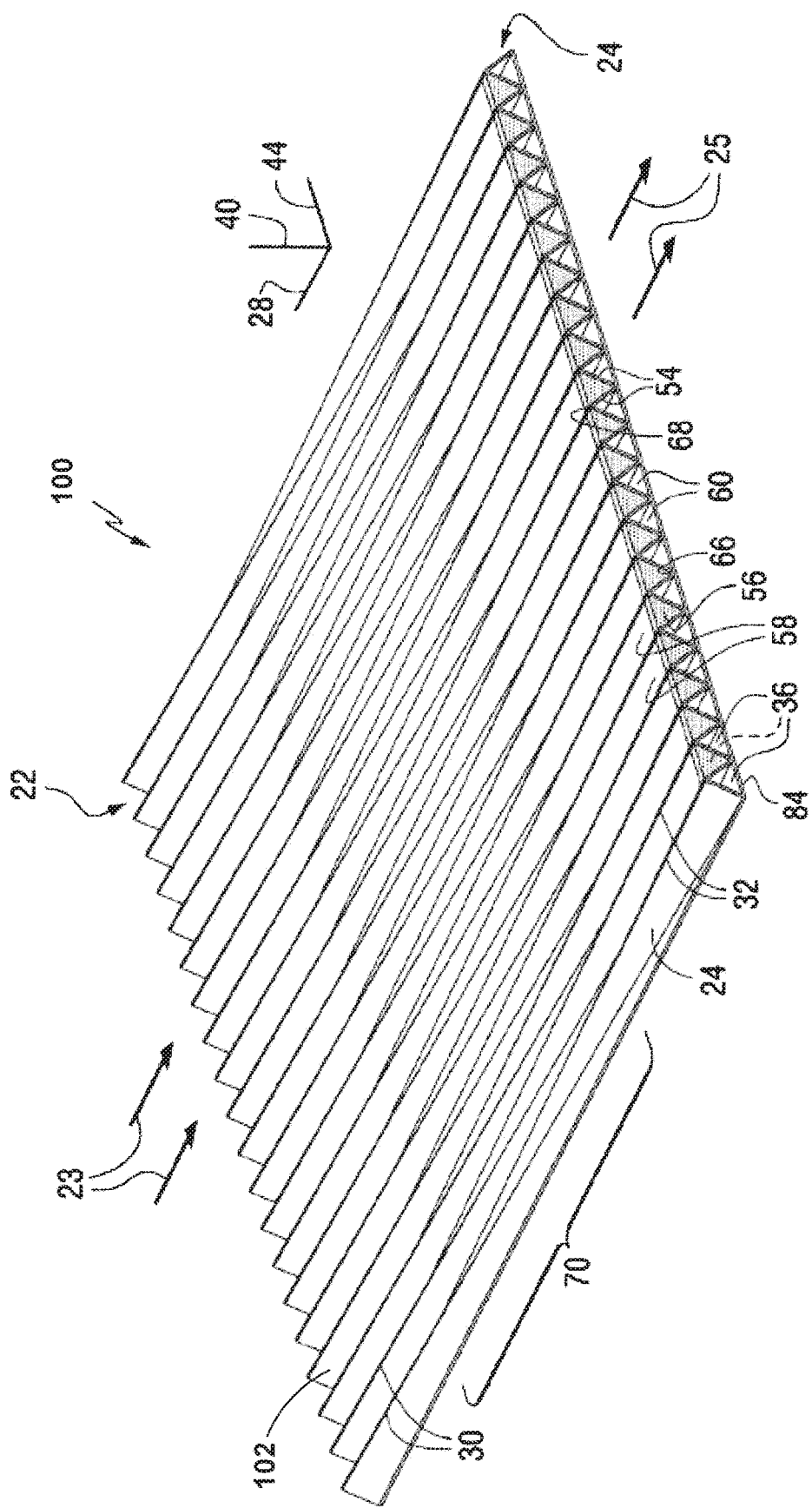

Referring to FIGS. 1-7C, filter media 100 is shown according to an example embodiment. FIG. 1 shows a perspective view of a folded (i.e., pleated) filter media sheet 102 of the filter media 100. FIGS. 2, 3, and 4 each show a different perspective view of the filter media 100. As described below, the filter media 100 includes a plurality of flow channels 36 having a tetrahedral shape. Additional details of the filter media 100 are described in U.S. Pat. No. 8,397,920, which is herein incorporated by reference in its entirety and for all purposes. The filter media 100 has an upstream inlet 22 receiving incoming dirty fluid as shown at arrows 23, and a downstream outlet 24 discharging clean filtered fluid as shown at arrows 25. The filter media 100 is composed of a folded filter media sheet 102 that is pleated along a plurality of bend lines 26. The bend lines extend axially along an axial direction 28 (e.g., as shown best in FIGS. 2-4), and include a first set of bend lines 30 extending from upstream inlet 22 towards downstream outlet 24, and a second set of bend lines 32 extending from downstream outlet 24 axially towards upstream inlet 22. The filter media 100 comprises a plurality of filter media wall segments 34 extending in serpentine manner between the bend lines. The wall segments 34 extend axially and define axial flow channels 36 therebetween. The flow channels 36 have a height 38 along a transverse direction 40, which transverse direction 40 is perpendicular to axial direction 28 (e.g., as shown in FIG. 2). The flow channels 36 have a lateral width 42 along a lateral direction 44. The lateral direction is perpendicular to axial direction 28 and is perpendicular to transverse direction 40. As described below, at least some of the noted bend lines taper in the noted transverse direction as they extend axially in the noted axial direction.

The wall segments 34 include a first set of wall segments 46 (e.g., as shown in FIGS. 2 and 3) that are alternately sealed to each other at upstream inlet 22 (e.g., by adhesive 48 or the like) to define a first set of channels 50 having open upstream ends, and a second set of tetrahedron channels 52 interdigitated with the first set of tetrahedron channels 50 and having closed upstream ends. The wall segments 34 include a second set of wall segments 54 (e.g., as shown in FIGS. 3 and 4) that are alternately sealed to each other at downstream outlet 24 (e.g., by adhesive 56 or the like) to define a third set of tetrahedron channels 58 having closed downstream ends, and a fourth set of tetrahedron channels 60 (e.g., as shown in FIG. 4) having open downstream ends. The first set of bend lines 30 comprises a first subset of bend lines 62 defining the first set of tetrahedron channels 50, and a second subset of bend lines 64 defining the second set of tetrahedron channels 52. The second subset of bend lines 64 taper in transverse direction 40 as they extend from upstream inlet 22 axially towards downstream outlet 24 (e.g., as shown in FIGS. 3 through 6). The second set of bend lines 32 comprises a third subset of bend lines 66 defining the third set of tetrahedron channels 58, and a fourth subset of bend lines 68 defining the fourth set of tetrahedron channels 60. The fourth subset of bend lines 68 taper in the transverse direction 40 as they extend from downstream outlet 24 axially towards upstream inlet 22 (e.g., as shown in FIGS. 3 through 6). The second set of tetrahedron channels 52 have a decreasing transverse channel height 38 along transverse direction 40 as the second set of tetrahedron channels 52 extend axially along axial direction 28 towards downstream outlet 24. The tapering of the second subset of bend lines 64 in the transverse direction 40 provides the decreasing transverse channel height 38 of the second set of tetrahedron channels 52. The fourth set of tetrahedron channels 60 have a decreasing transverse channel height along transverse direction 40 as the fourth set of tetrahedron channels 60 extend axially along axial direction 28 towards upstream inlet 22. The tapering of the fourth subset of bend lines 68 in the transverse direction 40 provides the decreasing transverse channel height 38 of the fourth set of tetrahedron channels 60.

Still referring to FIGS. 1-4, incoming dirty fluid 23 to be filtered flows along axial direction 28 into open tetrahedron channels 50 at upstream inlet 22 and passes laterally and/or transversely through the filter media wall segments of the pleated filter element and then flows axially along axial direction 28 as clean filtered fluid through open tetrahedron channels 60 at downstream outlet 24. A second subset of bend lines 64 provides lateral cross-flow thereacross along lateral direction 44 between respective channels downstream of upstream inlet 22. A fourth subset of bend lines 68 provides lateral cross-flow thereacross along lateral direction 44 between respective channels upstream of downstream outlet 24. The second and fourth subsets of bend lines 64 and 68 have axially overlapping sections 70, and the noted lateral cross-flow is provided at least at axially overlapping sections 70.

The second subset of bend lines 64 taper to respective termination points 72 (e.g., as shown in FIGS. 3 through 6), providing at such termination points the minimum transverse channel height 38 of the second set of tetrahedron channels 52. The fourth subset of bend lines 68 taper to respective termination points 74, providing at such termination points the minimum transverse channel height 38 of the fourth set of tetrahedron channels 60. Termination points 72 of second subset of bend lines 64 are axially downstream of termination points 74 of fourth subset of bend lines 68. This provides the noted axially overlapping sections 70. Termination points 72 of second subset of bend lines 64 are at downstream outlet 24 in one embodiment, and in other embodiments are axially upstream of downstream outlet 24. Termination points 74 of fourth subset of bend lines 68 are at upstream inlet 22 in one embodiment, and in other embodiments are axially downstream of upstream inlet 22.

A first set of wall segments 46 alternately sealed to each other at adhesive 48 at upstream inlet 22 define a first set of tetrahedron channels 50 having open upstream ends, and a second set of tetrahedron channels 52 interdigitated with the first set of tetrahedron channels 50 and having closed upstream ends. A second set of wall segments 54 alternately sealed to each other at adhesive 56 at downstream outlet 24 define a third set of tetrahedron channels 58 having closed downstream ends, and a fourth set of tetrahedron channels 60 interdigitated with the third set of tetrahedron channels 58 and having open downstream ends. The first set of bend lines 30 includes the first subset of bend lines 62 defining the first set of tetrahedron channels 50, and the second subset of bend lines 64 defining the second set of tetrahedron channels 52. The second subset of bend lines 64 taper in the transverse direction 40 as they extend from upstream inlet 22 axially towards downstream outlet 24. The second set of bend lines 32 includes the third subset of bend lines 66 defining the third set of tetrahedron channels 58, and the fourth subset of bend lines 68 defining the fourth set of tetrahedron channels 60. The fourth subset of bend lines 68 taper in the transverse direction 40 as they extend from downstream outlet 24 axially towards upstream inlet 22.

First and second sets of tetrahedron channels 50 and 52 face oppositely to third and fourth sets of tetrahedron channels 58 and 60. Each of the first, second, third and fourth sets of tetrahedron channels 50, 52, 58, 60 is elongated in the axial direction 28. Each of the first, second, third and fourth sets of tetrahedron channels 50, 52, 58, 60 has a cross-sectional area along a cross-sectional plane defined by the transverse and lateral directions 40 and 44. The cross-sectional areas of the first and second sets of tetrahedron channels 50 and 52 decrease as the first and second sets of tetrahedron channels 50 and 52 extend along axial direction 28 from upstream inlet 22 toward downstream outlet 24. The cross-sectional areas of third and fourth sets of tetrahedron channels 58 and 60 decrease as the third and fourth sets of tetrahedron channels 58 and 60 extend along axial direction 28 from downstream outlet 24 toward upstream inlet 22. In some arrangements, the bend lines 26 are bent at a sharp pointed angle (e.g., as shown at 80 in FIG. 2). In other arrangements, the bend lines 26 are rounded along a given radius (e.g., as shown in dashed line at 82 in FIG. 2).

The elongated tetrahedron channels 58 and 60 allow for cross-flow between adjacent channels. In air filter implementations, this cross-flow allows for more even dust loading on the upstream side of the media. In one embodiment, the elongated tetrahedron channels are shaped to purposely allow for more upstream void volume than downstream void volume, to increase filter capacity. Various fluids may be filtered, including air or other gases, and including liquids.

The filter element is further provided with a substantially flat sheet 84 extending laterally across the bend lines. In one embodiment, the flat sheet 84 is formed of filter media material, which may be the same filter media material as the folded filter media sheet 102. The flat sheet 84 extends axially along the full axial length along axial direction 28 between upstream inlet 22 and downstream outlet 24, and extends laterally along the full lateral width along lateral direction 44 across and sealing the channels to prevent bypass of dirty upstream air to clean downstream air without passing through and being filtered by a wall segment 34. In some arrangements, the flat sheet 84 is generally rectiplanar along a plane defined by axial direction 28 and lateral direction 44.

Figure 5:
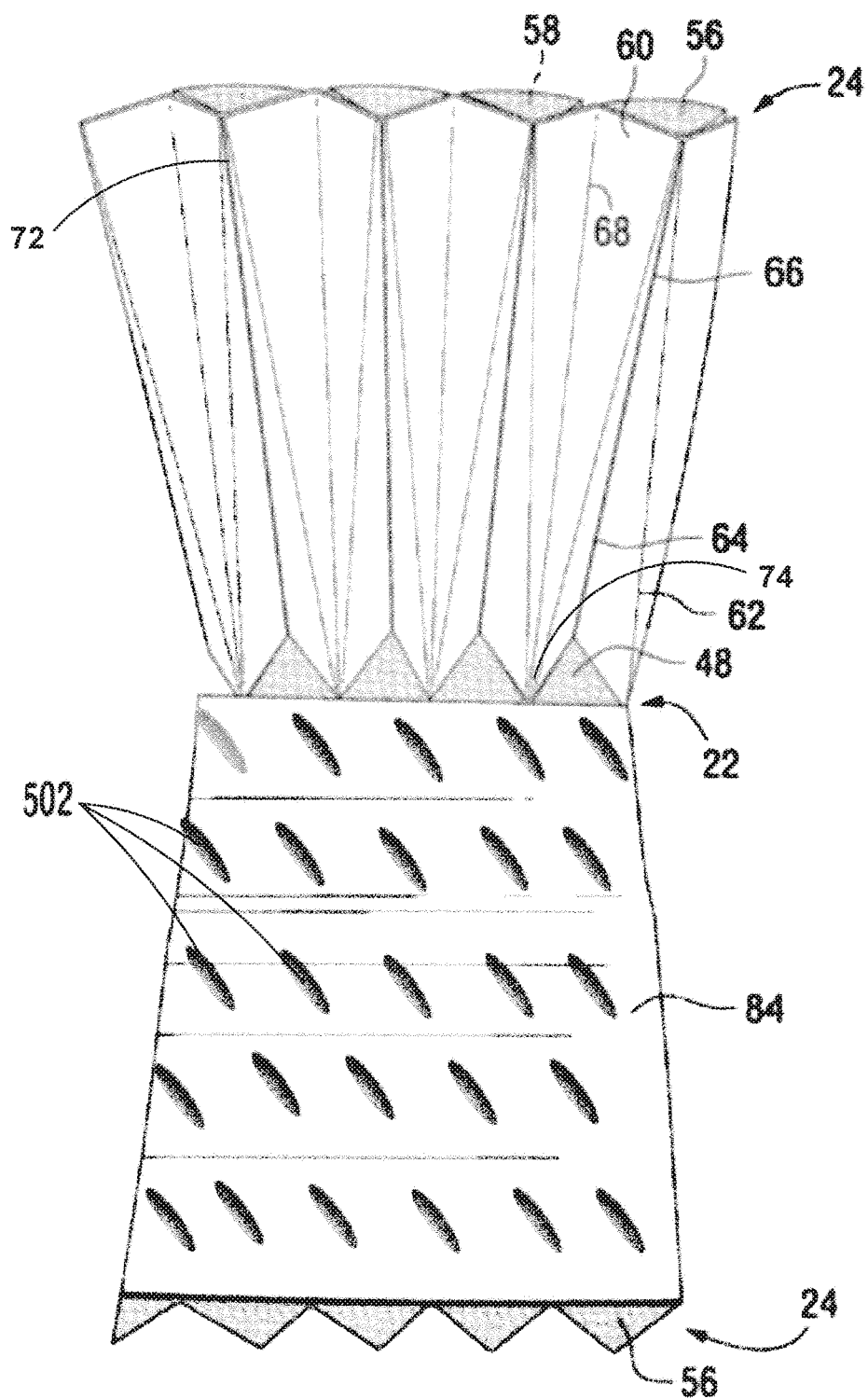
FIG. 5 shows a perspective view of the filter media of FIG. 1 having an embossment arrangement according to an example embodiment.
Figure 6:
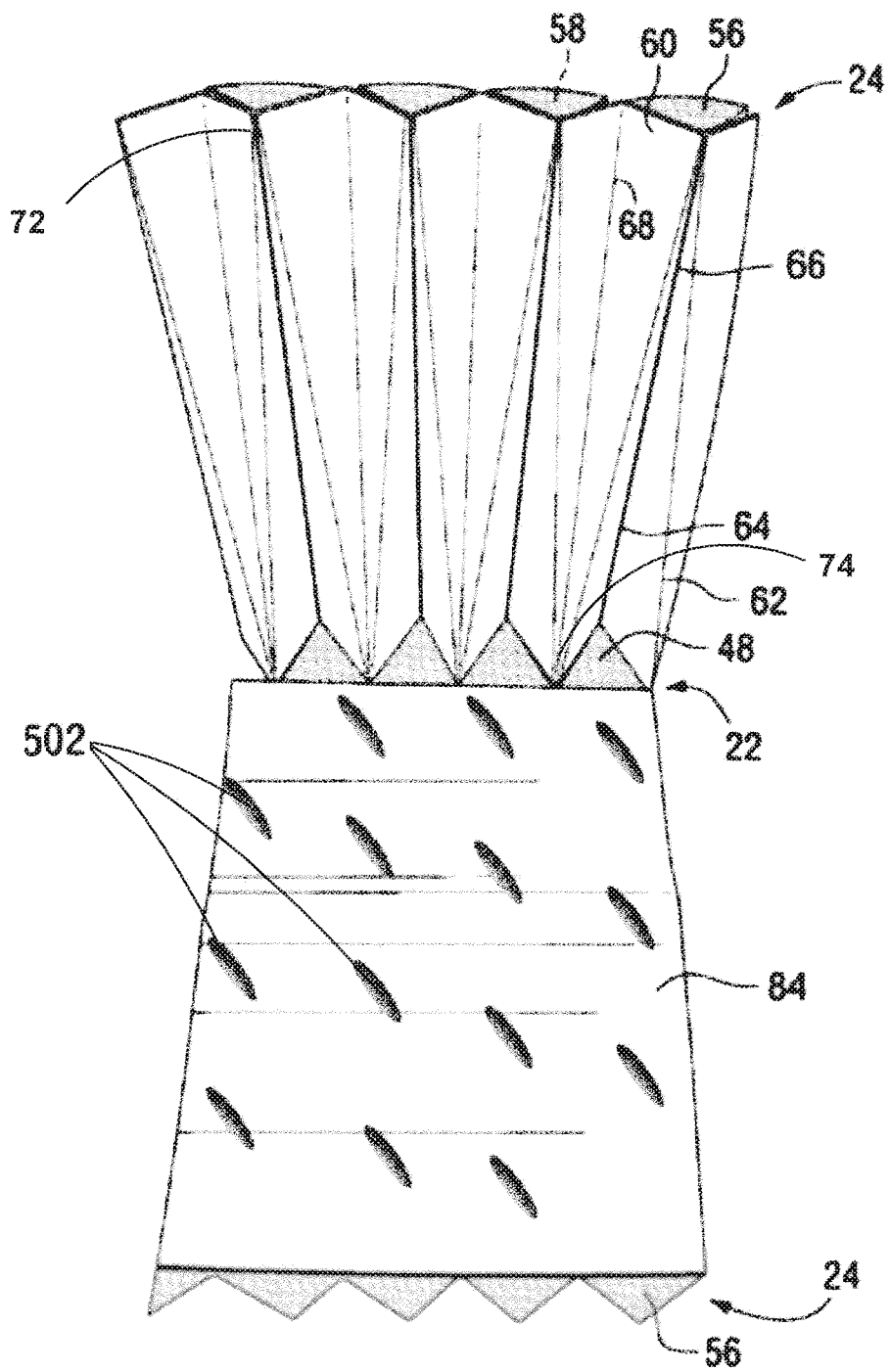
FIG. 6 shows a perspective view of the filter media of FIG. 1 having a first embossment arrangement according to an example embodiment.

As shown in FIG. 5, the flat sheet 84 includes a plurality of embossments 502. The embossments 502 form a raised surface (with respect to the generally rectiplanar surface of the flat sheet 84) on a first side of the flat sheet 84 and a corresponding lowered surface (with respect to the generally rectiplanar surface of the flat sheet 84). Although shown as being oval in shape, the embossments 502 can have any shape (e.g., circular, triangular, square, rectangular, etc.). The embossments 502 are arranged in an interrupted straight line pattern. In some arrangements, the embossments 502 are arranged such that the embossments 502 align with the peaks of the flow channels 36. Accordingly, when the filter media 100 is folded, layered, or coiled to form a pleat block, the peaks of the flow channels 36 rest against the raised surface of the embossments 502 thereby creating a separation distance between the flat sheet 84 and the folded filter media sheet 102, which is maintained during use. The separation distance increases the dust holding capacity of the filter media 100 and reduces the restriction of the filter media 100, which results in a lower pressure drop and increased capacity compared to similar filter media without the embossments. The embossments 502 may be formed in the flat sheet 84 through an embossment roller. FIG. 6 shows another arrangement of embossments 502 on the flat sheet 84 in which the embossments 502 are arranged in a less dense angled pattern than the embossments of FIG. 5.

Figure 7A:
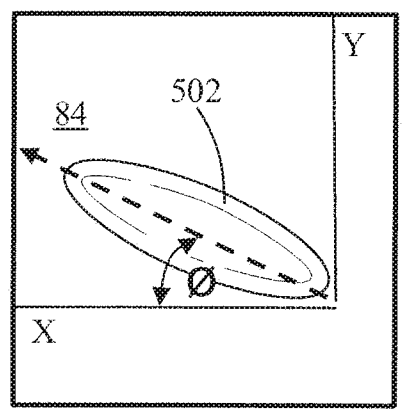
FIGS. 7A, 7B, and 7C each show a close-up perspective view of an embossment of the filter media of FIG. 1 or FIG. 8 oriented at a different angle.
Figure 7B:
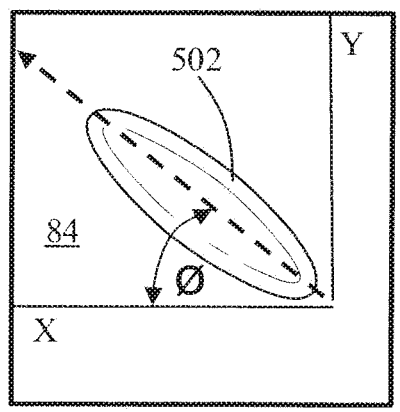
Figure 7C:
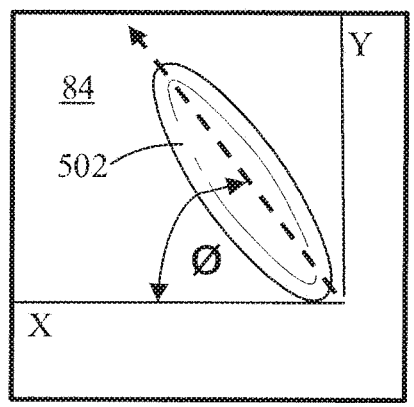

Referring to FIGS. 7A through 7C, close-up perspective views of an embossment 502 arranged at different angles φ on the flat sheet 84 are shown. In each of FIGS. 7A through 7C, the angle φ is measured with respect to an X-Y axis that define the plane of the flat sheet 84. The X axis is aligned with the lateral direction 44 of FIGS. 2-4, and the Y axis is aligned with the axial direction 28 of FIGS. 2-4. The angle φ of the embossment 502 is selected to optimize the air flow through the filter media 100. As described above, the embossments 502 maintain separation between the layers of the filter media 100. Accordingly, the angle φ is selected to be aligned with the flow direction of the air through the filter media 100 to minimize added restriction or the introduction of turbulence into the air flow. In some arrangements, the angle φ is between zero and sixty degrees. In other arrangements, the angle φ is between thirty-five degrees and fifty five degrees. In further arrangements, the angle φ is approximately forty-five degrees.

Referring to FIGS. 8-13, filter media 200 is shown according to another example embodiment. The filter media 200 is similar to the filter media 100 of FIGS. 1-6. Differences between this embodiment and the embodiment of FIGS. 1-6 involve the filter media 200 having the opposite fluid flow path of the filter media 100 and the fluid path in the filter media 200 being the opposite of the filter media 100. Accordingly, like numbering is used to designate like parts between the filter media 200 and the filter media 100. As will be appreciated, due to the orientation and fluid flow path, the filter media 200 provides improvements in capacity over alternative arrangements.

Figure 8:
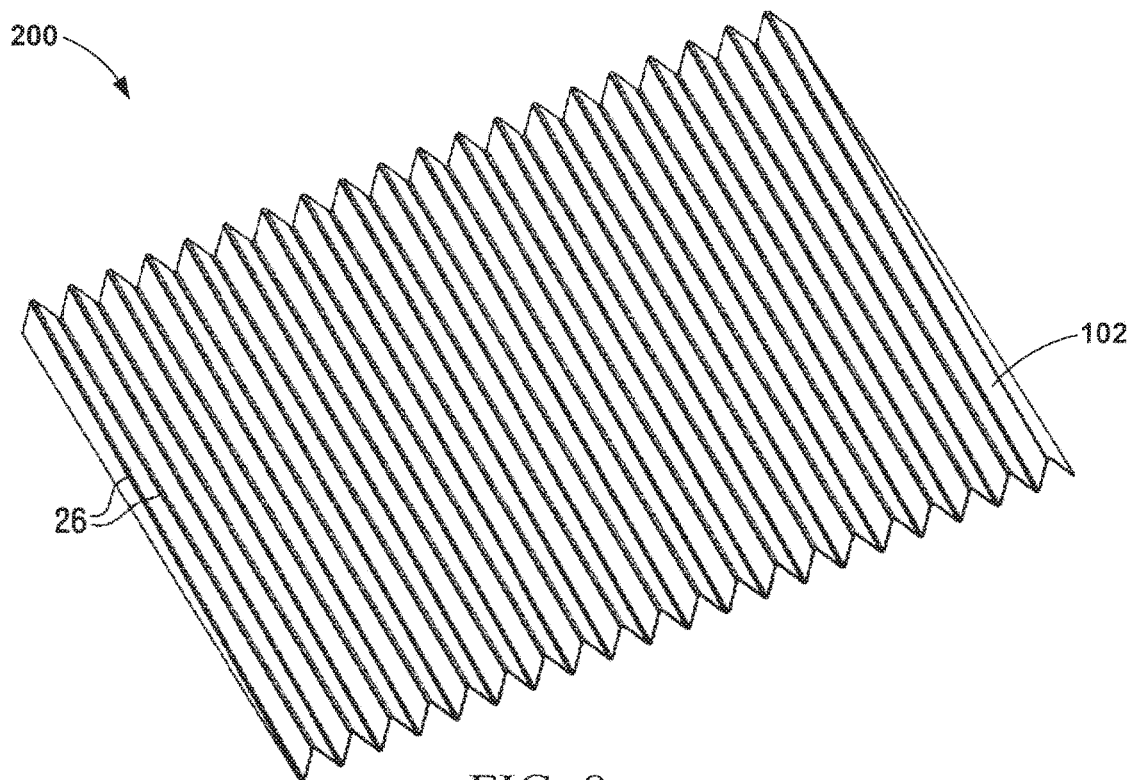
FIG. 8 shows a perspective view of a folded filter media sheet of filter media according to another example embodiment.
Figure 9:
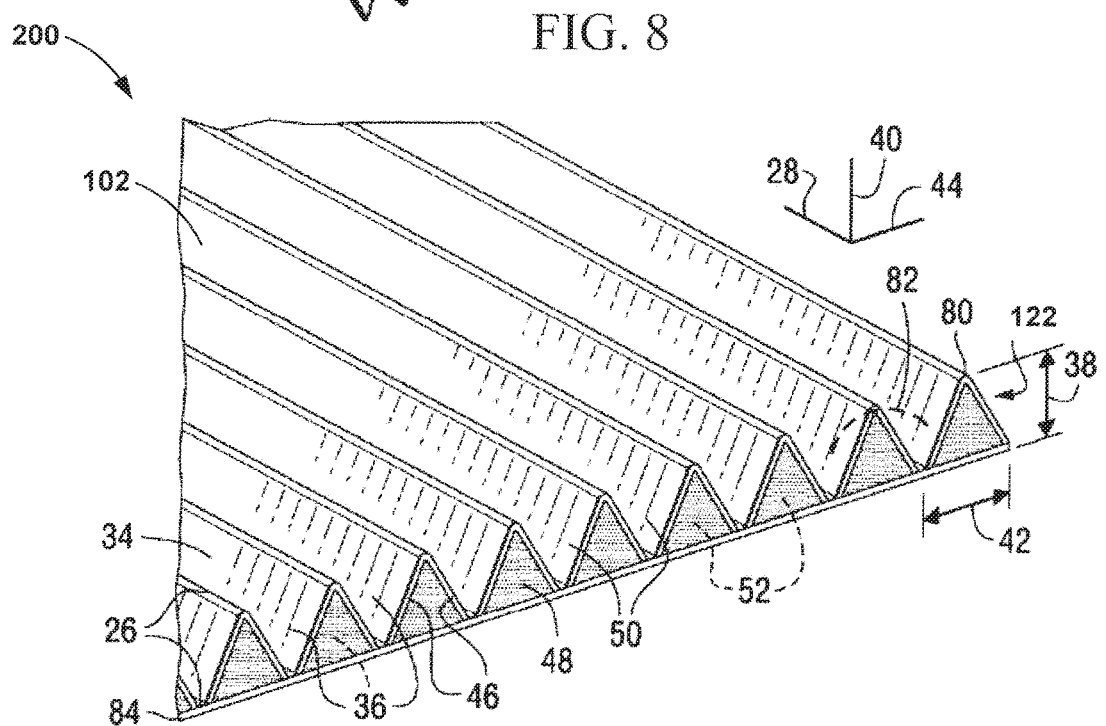
FIG. 9, FIG. 10, and FIG. 11 each show a different perspective view of the filter media of FIG. 8.
Figure 10:
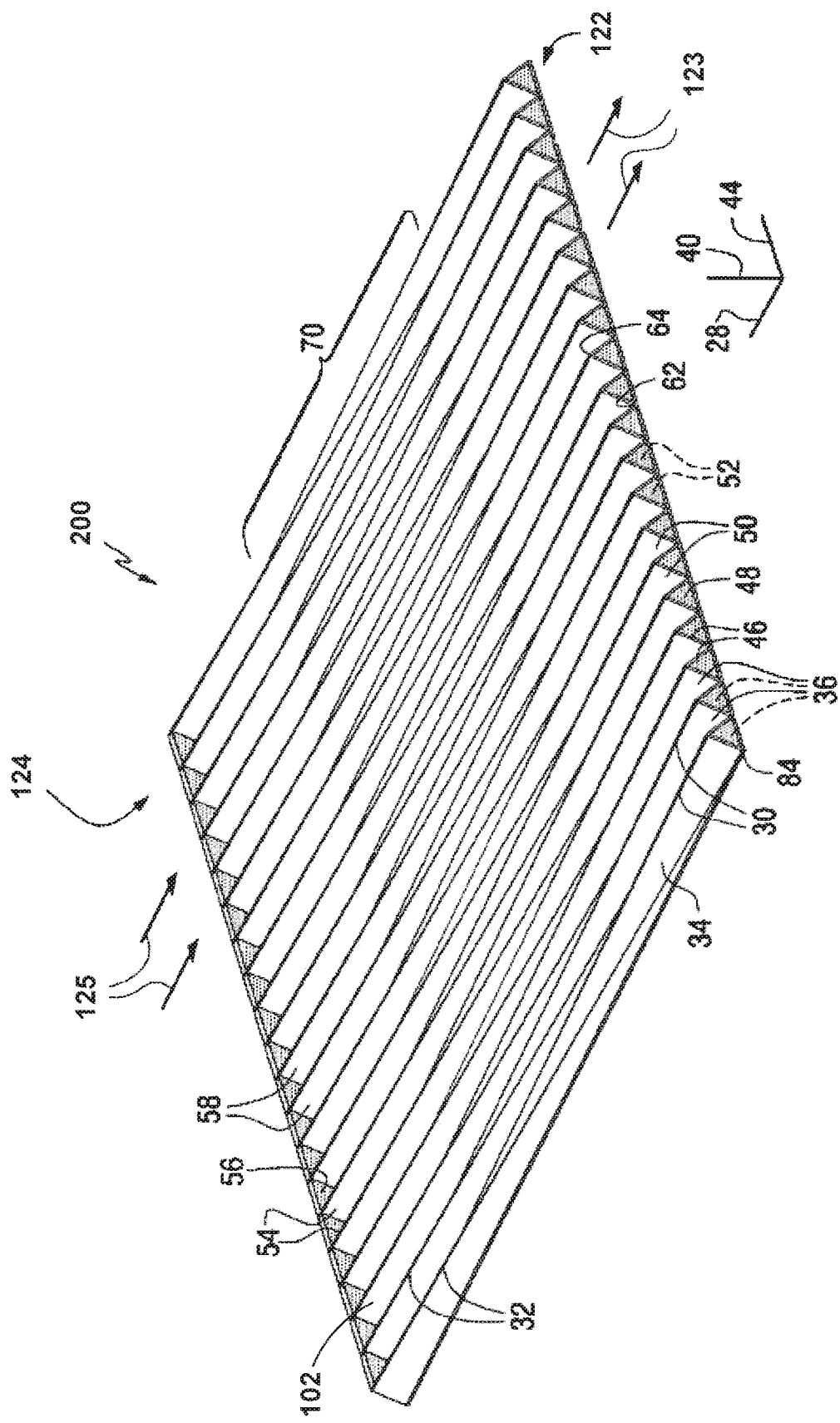
Figure 11:
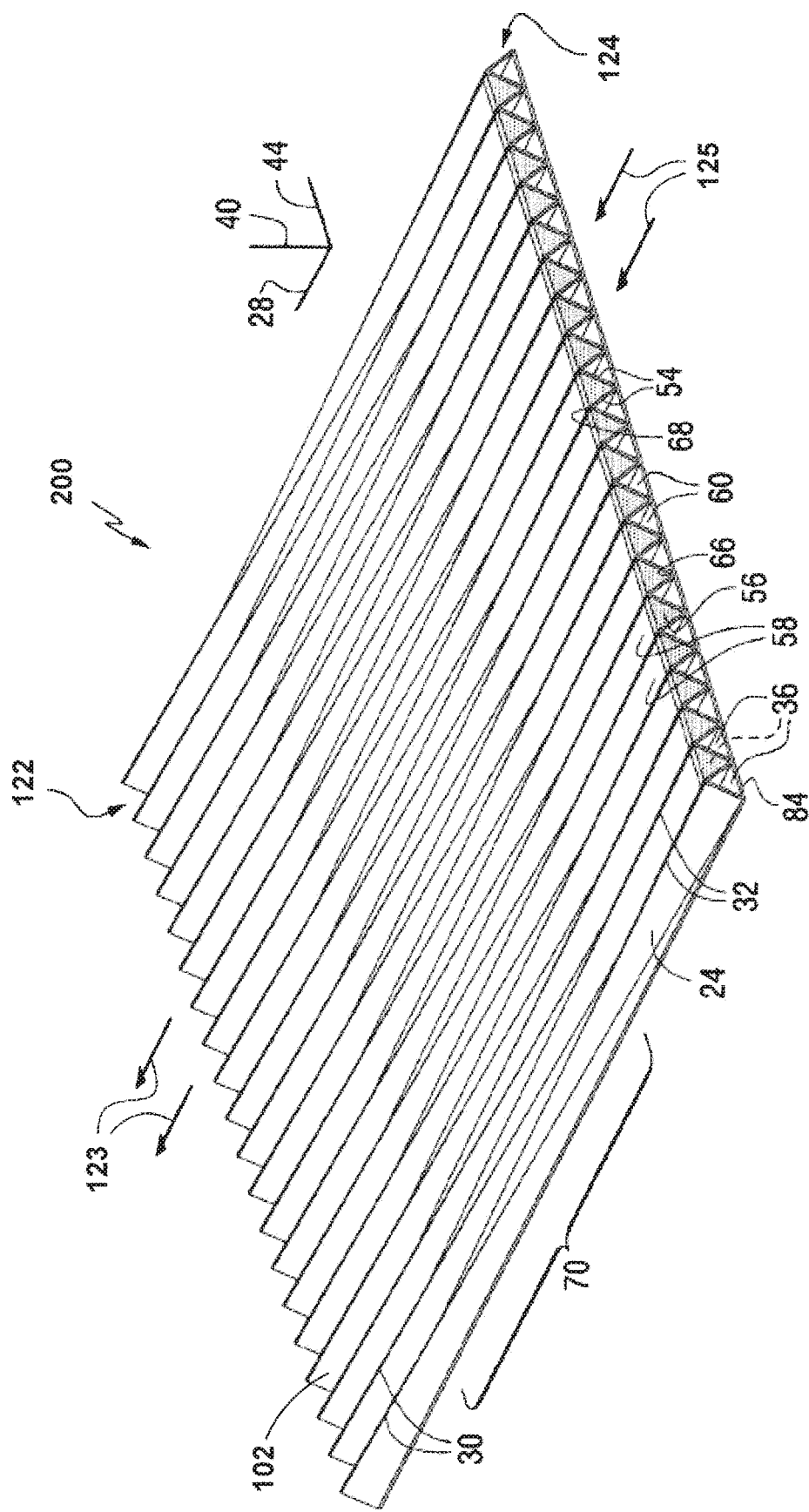

FIG. 8 shows a perspective view of a folded (i.e., pleated) filter media sheet 102 of the filter media 200. FIGS. 9, 10, and 11 each show a different perspective view of the filter media 200. As described below, the filter media 200 includes a plurality of flow channels 36 having a tetrahedral shape. Additional details of the filter media 200 are generally described in U.S. Pat. No. 8,397,920, which is herein incorporated by reference in its entirety and for all purposes. The filter media 200 has an upstream inlet 124 receiving incoming dirty fluid as shown at arrows 125, and a downstream outlet 122 discharging clean filtered fluid as shown at arrows 123. The filter media 200 is composed of a folded filter media sheet 102 that is pleated along a plurality of bend lines 26. The bend lines extend axially along an axial direction 28 (e.g., as shown best in FIGS. 9-11), and include a first set of bend lines 32 extending from upstream inlet 124 axially towards downstream outlet 122 and a second set of bend lines 30 extending from downstream outlet 122 towards upstream inlet 124. The filter media 200 comprises a plurality of filter media wall segments 34 extending in serpentine manner between the bend lines. The wall segments 34 extend axially and define axial flow channels 36 therebetween. The flow channels 36 have a height 38 along a transverse direction 40, which transverse direction 40 is perpendicular to axial direction 28 (e.g., as shown in FIG. 9). The flow channels 36 have a lateral width 42 along a lateral direction 44. The lateral direction is perpendicular to axial direction 28 and is perpendicular to transverse direction 40. As described below, at least some of the noted bend lines taper in the noted transverse direction as they extend axially in the noted axial direction.

The wall segments 34 include a first set of wall segments 54 (e.g., as shown in FIGS. 9 and 10) that are alternately sealed to each other at upstream inlet 124 (e.g., by adhesive 48 or the like) to define a first set of channels 60 having open upstream ends, and a second set of tetrahedron channels 58 interdigitated with the first set of tetrahedron channels 60 and having closed upstream ends. The wall segments 34 include a second set of wall segments 46 (e.g., as shown in FIGS. 10 and 11) that are alternately sealed to each other at downstream outlet 122 (e.g., by adhesive 56 or the like) to define a fourth set of tetrahedron channels 50 (e.g., as shown in FIG. 11) having open downstream ends, and a third set of tetrahedron channels 52 having closed downstream ends. The first set of bend lines 32 comprises a first subset of bend lines 68 defining the first set of tetrahedron channels 60 and a second subset of bend lines 66 defining the second set of tetrahedron channels 58. The first subset of bend lines 68 taper in the transverse direction 40 as they extend from upstream inlet 124 axially towards downstream outlet 122 (e.g., as shown in FIGS. 10 through 13). The second set of bend lines 30 comprises a fourth subset of bend lines 62 defining the fourth set of tetrahedron channels 50, and a third subset of bend lines 64 defining the third set of tetrahedron channels 52. The third subset of bend lines 64 taper in transverse direction 40 as they extend from downstream outlet 122 axially towards upstream inlet 124 (e.g., as shown in FIGS. 10 through 13). The third set of tetrahedron channels 52 have a decreasing transverse channel height 38 along transverse direction 40 as the third set of tetrahedron channels 52 extend axially along axial direction 28 towards upstream inlet 124. The tapering of the third subset of bend lines 64 in the transverse direction 40 provides the decreasing transverse channel height 38 of the third set of tetrahedron channels 52. The first set of tetrahedron channels 60 have a decreasing transverse channel height along transverse direction 40 as the first set of tetrahedron channels 60 extend axially along axial direction 28 towards downstream outlet 122. The tapering of the first subset of bend lines 68 in the transverse direction 40 provides the decreasing transverse channel height 38 of the first set of tetrahedron channels 60.

Still referring to FIGS. 8-11, incoming dirty fluid 125 to be filtered flows along axial direction 28 into open tetrahedron channels 60 at upstream inlet 124 and passes laterally and/or transversely through the filter media wall segments of the pleated filter element and then flows axially along axial direction 28 as clean filtered fluid through open tetrahedron channels 50 at downstream outlet 122. A third subset of bend lines 64 provides lateral cross-flow thereacross along lateral direction 44 between respective channels downstream of upstream inlet 124. A first subset of bend lines 68 provides lateral cross-flow thereacross along lateral direction 44 between respective channels upstream of downstream outlet 122. The first and third subsets of bend lines 68 and 64 have axially overlapping sections 70, and the noted lateral cross-flow is provided at least at axially overlapping sections 70.

The third subset of bend lines 64 taper to respective termination points 72 (e.g., as shown in FIGS. 10 through 13), providing at such termination points the minimum transverse channel height 38 of the third set of tetrahedron channels 52. The first subset of bend lines 68 taper to respective termination points 74, providing at such termination points the minimum transverse channel height 38 of the first set of tetrahedron channels 60. Termination points 72 of third subset of bend lines 64 are axially upstream of termination points 74 of first subset of bend lines 68. This provides the noted axially overlapping sections 70. Termination points 72 of third subset of bend lines 64 are at upstream inlet 124 in one embodiment, and in other embodiments are axially downstream of upstream inlet 124. Termination points 74 of first subset of bend lines 68 are at downstream outlet 122 in one embodiment, and in other embodiments are axially upstream of downstream outlet 122.

A second set of wall segments 46 alternately sealed to each other at adhesive 48 at downstream outlet 122 define a fourth set of tetrahedron channels 50 having open downstream ends, and a third set of tetrahedron channels 52 interdigitated with the fourth set of tetrahedron channels 50 and having closed downstream ends. A first set of wall segments 54 alternately sealed to each other at adhesive 56 at upstream inlet 124 define a second set of tetrahedron channels 58 having closed upstream ends, and a first set of tetrahedron channels 60 interdigitated with the second set of tetrahedron channels 58 and having open upstream ends. The second set of bend lines 30 includes the fourth subset of bend lines 62 defining the fourth set of tetrahedron channels 50, and the third subset of bend lines 64 defining the third set of tetrahedron channels 52. The third subset of bend lines 64 taper in the transverse direction 40 as they extend from downstream outlet 122 axially towards upstream inlet 124. The first set of bend lines 32 includes the second subset of bend lines 66 defining the second set of tetrahedron channels 58, and the first subset of bend lines 68 defining the first set of tetrahedron channels 60. The first subset of bend lines 68 taper in the transverse direction 40 as they extend from upstream inlet 124 axially towards downstream outlet 122.

First and second sets of tetrahedron channels 60 and 58 face oppositely to third and fourth sets of tetrahedron channels 52, and 50, respectively. Each of the first, second, third and fourth sets of tetrahedron channels 60, 58, 52, 50 is elongated in the axial direction 28. Each of the first, second, third and fourth sets of tetrahedron channels 60, 58, 52, 50 has a cross-sectional area along a cross-sectional plane defined by the transverse and lateral directions 40 and 44. The cross-sectional areas of first and second sets of tetrahedron channels 60 and 58 decrease as the of first and second sets of tetrahedron channels 60 and 58 extend along axial direction 28 from upstream inlet 124 toward downstream outlet 122. The cross-sectional areas of the third and fourth sets of tetrahedron channels 52 and 50 decrease as the third and fourth sets of tetrahedron channels 52 and 50 extend along axial direction 28 from downstream outlet 122 toward upstream inlet 124. In some arrangements, the bend lines 26 are bent at a sharp pointed angle (e.g., as shown at 80 in FIG. 9). In other arrangements, the bend lines 26 are rounded along a given radius (e.g., as shown in dashed line at 82 in FIG. 9).

The elongated tetrahedron channels 58 and 60 allow for cross-flow between adjacent channels. In air filter implementations, this cross-flow allows for more even dust loading on the downstream side of the media. In one embodiment, the elongated tetrahedron channels are shaped to purposely allow for more downstream void volume than upstream void volume, to increase filter capacity. Various fluids may be filtered, including air or other gases, and including liquids.

The filter element is further provided with a substantially flat sheet 84 extending laterally across the bend lines. In one embodiment, the flat sheet 84 is formed of filter media material, which may be the same filter media material as the folded filter media sheet 102. The flat sheet 84 extends axially along the full axial length along axial direction 28 between downstream outlet 122 and upstream inlet 124, and extends laterally along the full lateral width along lateral direction 44 across and sealing the channels to prevent bypass of dirty upstream air to clean downstream air without passing through and being filtered by a wall segment 34. In some arrangements, the flat sheet 84 is generally rectiplanar along a plane defined by axial direction 28 and lateral direction 44.

Figure 12:
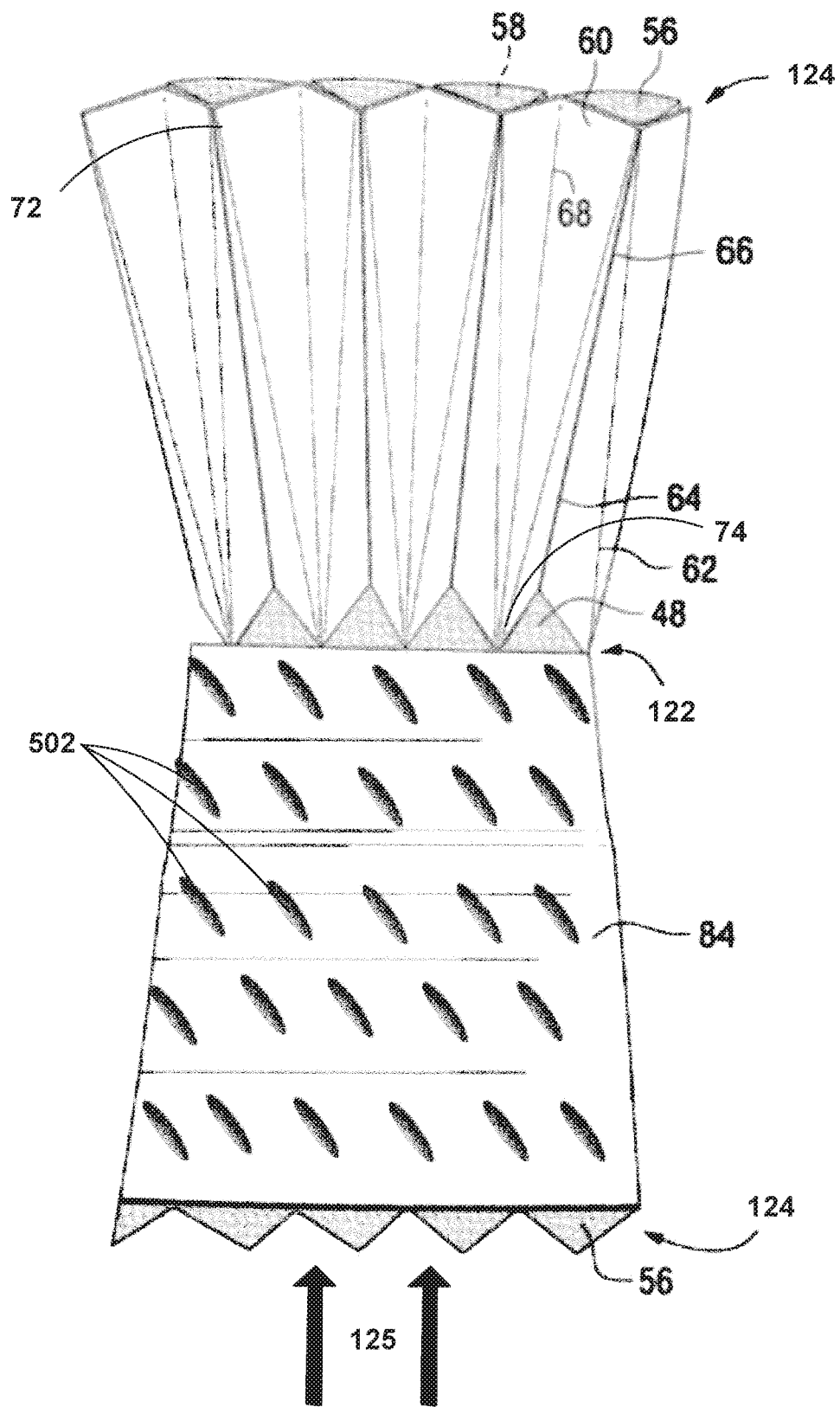
FIG. 12 shows a perspective view of the filter media of FIG. 8 having an embossment arrangement according to an example embodiment.
Figure 13:
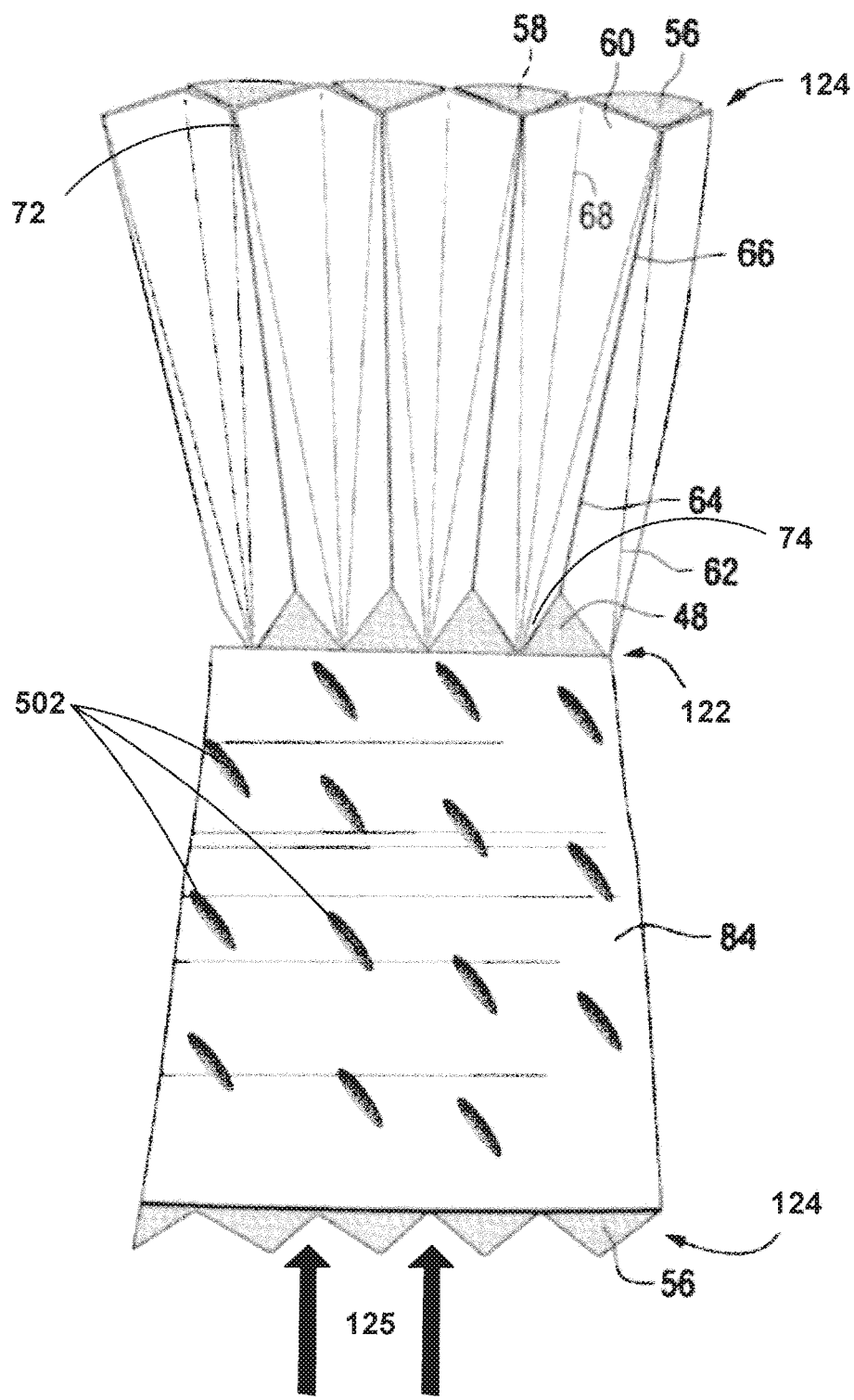
FIG. 13 shows a perspective view of the filter media of FIG. 8 having a first embossment arrangement according to an example embodiment.

As shown in FIG. 12, the flat sheet 84 includes a plurality of embossments 502. The embossments 502 form a raised surface (with respect to the generally rectiplanar surface of the flat sheet 84) on a first side of the flat sheet 84 and a corresponding lowered surface (with respect to the generally rectiplanar surface of the flat sheet 84). Although shown as being oval in shape, the embossments 502 can have any shape (e.g., circular, triangular, square, rectangular, etc.). The embossments 502 are arranged in an interrupted straight line pattern. In some arrangements, the embossments 502 are arranged such that the embossments 502 align with the peaks of the flow channels 36. Accordingly, when the filter media 200 is folded, layered, or coiled to form a pleat block, the peaks of the flow channels 36 rest against the raised surface of the embossments 502 thereby creating a separation distance between the flat sheet 84 and the folded filter media sheet 102, which is maintained during use. The separation distance increases the dust holding capacity of the filter media 200 and reduces the restriction of the filter media 200, which results in a lower pressure drop and increased capacity compared to similar filter media without the embossments. The embossments 502 may be formed in the flat sheet 84 through an embossment roller. FIG. 13 shows another arrangement of embossments 502 on the flat sheet 84 in which the embossments 502 are arranged in a less dense angled pattern than the embossments of FIG. 12.

Referring back to FIGS. 7A through 7C, the close-up perspective views of an embossment 502 arranged at different angles $\phi$ on the flat sheet 84 can be applied to the filter media 200. In each of FIGS. 7A through 7C, the angle $\phi$ is measured with respect to an X-Y axis that define the plane of the flat sheet 84. Accordingly, the X axis is aligned with the lateral direction 44 of FIGS. 9-11 and the Y axis is aligned with the axial direction 28 of FIGS. 9-11. The angle $\phi$ of the embossment 502 is selected to optimize the air flow through the filter media 200. As described above, the embossments 502 maintain separation between the layers of the filter media 200. Accordingly, the angle $\phi$ is selected to be aligned with the flow direction of the air through the filter media 200 to minimize added restriction or the introduction of turbulence into the air flow. In some arrangements, the angle $\phi$ is between zero and sixty degrees. In other arrangements, the angle $\phi$ is between thirty-five degrees and fifty five degrees. In further arrangements, the angle $\phi$ is approximately forty-five degrees.

Figure 14:
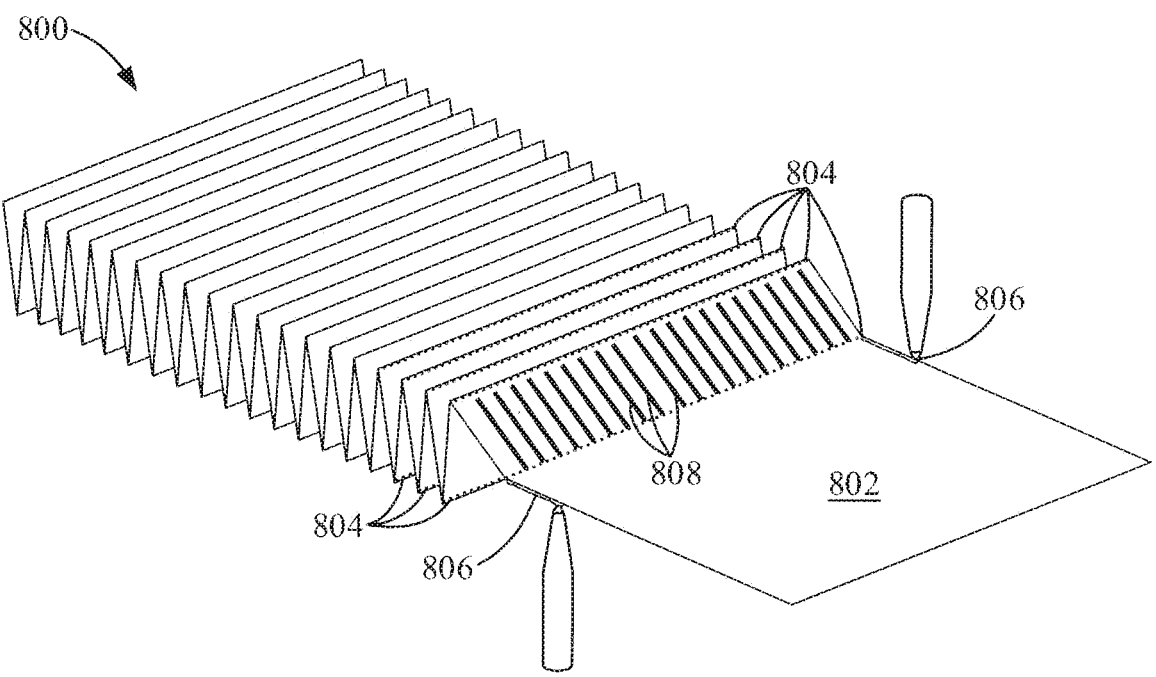
FIG. 14 shows a perspective view of filter media according to an example embodiment.

Referring to FIG. 14, a perspective view of filter media 800 is shown according to an example embodiment. The filter media 800 is a pleated filter media. The filter media 800 includes a flat sheet 802 that is alternately folded along pleat fold lines 804 to form the filter media 800. In some arrangements, the flat sheet 802 is held in the folded or pleated position to form a pleat block (e.g., as shown in FIG. 17) with adhesive 806. In such arrangements, the adhesive 806 may be placed on alternate sides of adjacent pleats. The pleat block includes a clean side (i.e., a filtered fluid outlet side) and a dirty side (i.e., an inlet side that receives fluid to be filtered). The flat sheet 802 is embossed to create embossments 808. The flat sheet 802 may be embossed by a pair of embossing rollers (e.g., embossing rollers 1002 and 1004 of FIG. 16) to create embossments 808. Each of the embossments 808 forms a raised surface. In some arrangements, the embossments 808 are created prior to the flat sheet 802 being pleated. In some arrangements, the embossments 808 are linear in shape. The embossments 808 extend in a direction that is perpendicular to the pleat fold lines 804. As in the filter media 100, the embossments 808 maintain a separation distance between adjacent pleats during use of the filter media 800. The separation distance increases the dust holding capacity of the filter media 800 and reduces the restriction of the filter media 800, which results in a lower pressure drop and increased capacity compared to similar filter media without the embossments 808.

Figure 15:
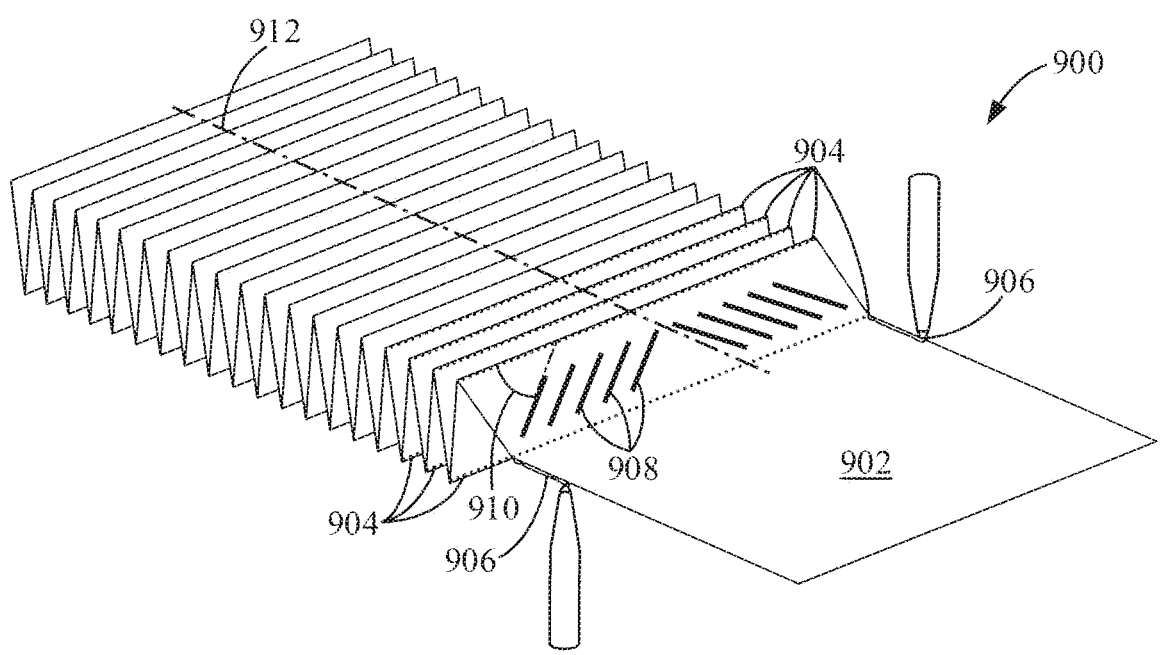
FIG. 15 shows a perspective view of filter media according to another example embodiment.

Referring to FIG. 15, a perspective view of filter media 900 is shown according to an example embodiment. The filter media 900 is similar to the filter media 800. The filter media 900 includes a flat sheet 902 that is alternately folded along pleat fold lines 904 to form the filter media 900. In some arrangements, the flat sheet 902 is held in the folded or pleated position to form a pleat block (e.g., as shown in FIG. 17) with adhesive 906. In such arrangements, the adhesive 906 may be placed on alternate sides of adjacent pleats. The pleat block includes a clean side (i.e., a filtered fluid outlet side) and a dirty side (i.e., an inlet side that receives fluid to be filtered). The flat sheet 902 is embossed to create embossments 908. The flat sheet 902 may be embossed by a pair of embossing rollers (e.g., embossing rollers 1002 and 1004 of FIG. 16) to create embossments 908. Each of the embossments 908 forms a raised surface. In some arrangements, the embossments 908 are created prior to the flat sheet 902 being pleated. The difference between the filter media 900 and the filter media 800 is the orientation and arrangement of the embossments 908. In some arrangements, the embossments 908 are linear in shape. The embossments 908 are oriented at an angle 910 with respect to the pleat fold lines 904. The angle 910 of the embossments 904 may be any of the angles described above with respect to the angle $\phi$ of the embossment 502 of the filter media 100. The angle 910 is less than 90 degrees. In some arrangements, the orientation of the embossments 908 is flipped about a center line 912 of the filter media 900. As in the filter media 100, the embossments 908 maintain a separation distance between adjacent pleats during use of the filter media 900. The separation distance increases the dust holding capacity of the filter media 900 and reduces the restriction of the filter media 900, which results in a lower pressure drop and increased capacity compared to similar filter media without the embossments 908.

Figure 16:
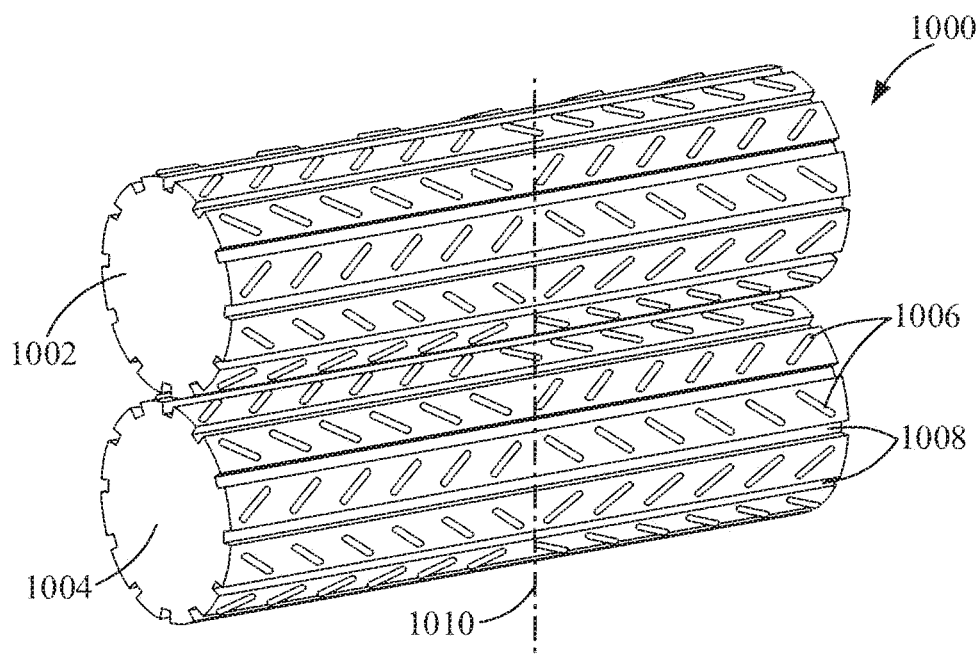
FIG. 16 is a perspective view of an embossing system according to an example embodiment.
Figure 17:
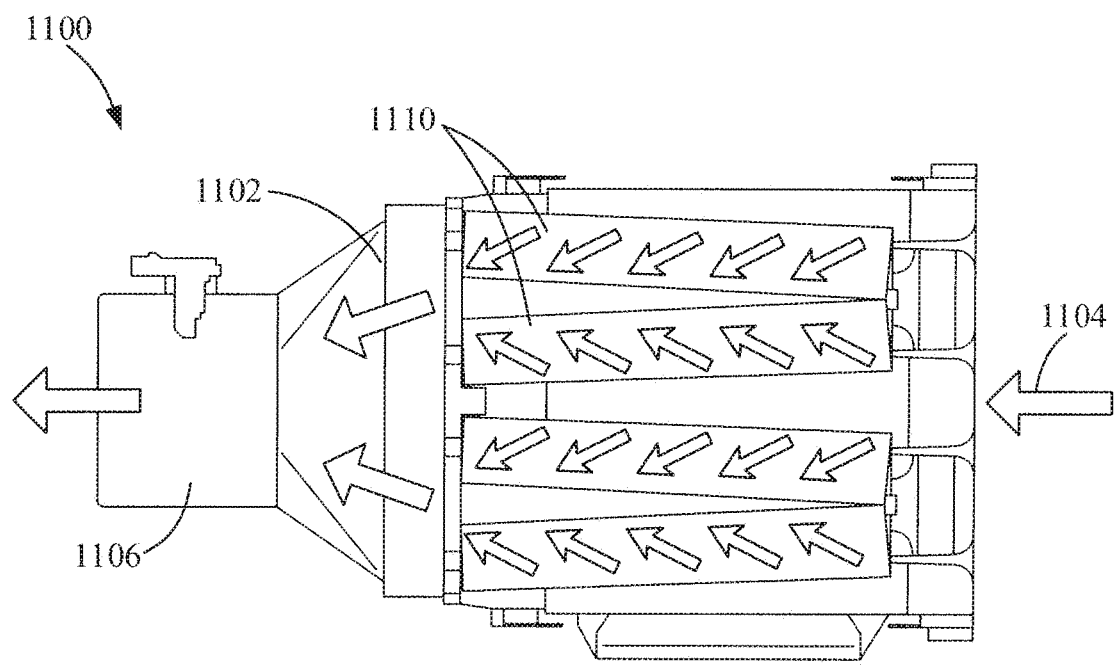
FIG. 17 shows a cross-sectional view of a filtration system according to an example embodiment.

Referring to FIG. 16, a perspective view of an embossing system 1000 is shown according to an example embodiment. The embossing system 1000 includes a first embossing roller 1002 and a second embossing roller 1004. The embossing rollers 1002 and 1004 are arranged in an opposing manner such that a sheet (e.g., the flat sheet 84, the flat sheet 802, the flat sheet 902, etc.) can be fed between the rollers 1002 and 1004 and embossed. Each embossing roller 1002 and 1004 includes projections 1006 that are arranged to provide embossments (e.g., embossments 502, embossments 808, embossments 908, etc.) to a flat sheet that passes between the rollers 1002 and 1004. In some arrangements, each roller 1002 and 1004 also includes a plurality of linear depressions 1008 extending across a length of the roller that provide creases where the flat sheet will be folded if the flat sheet is to be folded into pleated filter media. The linear depressions 1008 are perpendicular to the centerline 1010 of the rollers (which corresponds to the centerline of the flat sheet that is fed through the embossing system 1000).

Referring to FIG. 17, a cross-sectional view of a filtration system 1100 is shown according to an example embodiment. The filtration system 1100 includes a housing 1102 having an inlet (marked by inlet flow arrow 1104) and an outlet 1106. The filtration system 1100 includes two V-shaped filter elements 1108. Each of the V-shaped filter elements 1108 includes two pleat blocks 1110 that are arranged in a V-shape. The pleat blocks 1110 may be formed from the filter media 800 or the filter media 900. As fluid (e.g., air) passes from the inlet through the outlet 1106 of the housing 1102, the fluid passes through one of the pleat blocks 1110 where the fluid is filtered.

Figure 18:
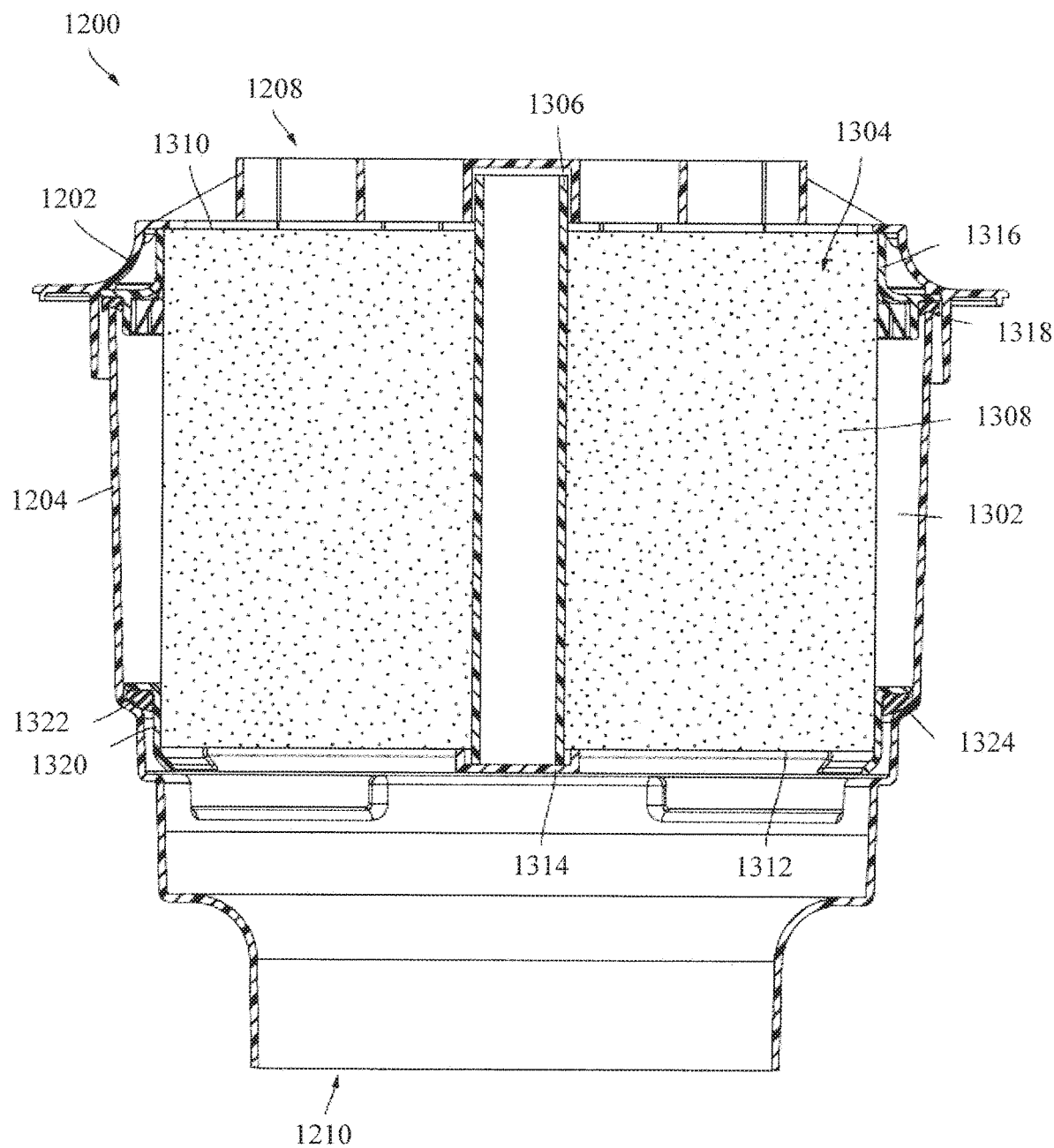
FIG. 18 shows a cross-sectional view of an air filtration system according to another example embodiment

Referring to FIG. 18, a cross-sectional view of an air filtration system 1200 is shown according to an example embodiment. The system 1200 filters air and provides clean air to a device, such as an internal combustion engine. The system 1200 is shown with an upper member 1202 secured to a housing 1204. The upper member 1202 is removably secured to the housing 1204 through a plurality of connections formed between the upper member 1202 and the housing 1204. The connections are formed by any suitable mechanical connection, such as snap-fit connections (e.g., formed by mating detents on the housing 1204 and the upper member 1202), screws, bolts, or the like. In some arrangements, the upper member 1202 is an inlet grate. The upper member 1202 includes an inlet opening 1208, and the housing 1204 includes an outlet opening 1210. The inlet opening 1208 and the outlet 1210 are substantially aligned such that a common axis passes through the centers of the inlet opening 1208 and the outlet opening 1210. Air to be filtered by the system 1200 enters the housing 1204 through the inlet opening 1208, passes through the housing 1204, and exits the housing 1204 through the outlet opening 1210. As described in further detail below, the housing 1204 includes a filter element 1304 positioned between the inlet opening 1208 and the outlet opening 1210 such that the air passing through the housing 1204 is filtered through the filter element 1304. Although the upper member 1202 may contact certain portions of the filter element 1304, the upper member 1202 is not fixed to the filter element 1304 such that the upper member 1202 can be removed from the filter element 1304 used with replacement filter elements. Since the upper member 1202 is reusable with replacement filter elements, replacement filter elements can be produced at a lesser cost than replacement filter elements that have an integral cover portion. The reusable upper member 1202 also reduces waste with each filter element replacement service in comparison to replacement filter elements that have an integral cover portion.

The housing 1204 includes a central compartment 1302 positioned between the inlet opening 1208 and the outlet opening 1210. As shown in FIG. 18, the filter element 1304 is positioned in the central compartment 1302 of the housing 1204. The filter element 1304 is in an installed position (i.e., the filter element 1304 is received in the compartment 1302 and the upper member 1202 is secured to the housing 1204). The filter element 1304 is an axial flow filter element. The filter element 1304 includes a central tube 1306 and filter media 1308 surrounding the central tube 1306. In some arrangements, the central tube 1306 is comprised of cardboard, which may be less expensive and more environmentally friendly than plastic. In one embodiment, the central tube 1306 is not perforated or porous, although other embodiments may include perforations and/or a certain level of porosity. A portion of the central tube 1306 extends into an opening in the upper member 1202 when the filter element 1304 is received in the housing 1204 in the installed position. In an alternative arrangement, the central tube 1306 does not extend into the upper member 1202 and includes a cap to seal the top portion of the central tube 1306. The filter media 1308 includes an inlet face 1310 that is substantially adjacent to the inlet opening 1208 of the upper member 1202. The filter media 1308 includes an outlet face 1312 that is substantially adjacent to the outlet opening 1210. The inlet face 1310 is spaced apart from the outlet face 1312. The inlet face 1310 is substantially parallel to the outlet face 1312. In an alternative arrangement, the filter element 1304 does not include a central tube. In such an arrangement, the filter media 1308 may be wound around a removable core.

The filter media 1308 may include pleated media (e.g., as described above with respect to filter media 800 or filter media 900), corrugated media, tetrahedral media (e.g., as described above with respect to filter media 100), or variations thereof. The filter media 1308 may be wound around the central tube 1306. The central tube 1306 is closed on both ends. A top end of the central tube 1306 is closed by the upper member 1202. In some arrangements, a bottom end of the central tube 1306 is closed by a cap 1314. However, it is possible for such a cap 1314 to be used to close the top end of the central tube 1306, either in place of or in addition to the use of a cap 1314 on the bottom end of the central tube 1306.

The filter element 1304 includes an upper support ring 1316. The upper support ring 1316 circumscribes the filter media 1308 adjacent the inlet face 1310. The upper support ring 1316 may be plastic, a polymer, or the like. In some arrangements, the upper support ring 1316 is secured to the filter media 1308 with an adhesive. In other arrangements, the upper support ring 1316 is secured to the filter media 1308 with a friction fit. The upper support ring 1316 includes an upper seal 1318. The upper seal 1318 may be a flat gasket. The upper seal 1318 may be an elastomeric seal. In some arrangements, the upper seal 1318 is a molded polyurethane seal. When the filter element 1304 is received within the housing 1204, the upper seal 1318 rests against an upper portion of the housing 1204. The upper member 1202 compresses the upper seal 1318 against the housing 1204 forming an axial seal between the upper support ring 1316 and the housing 1204. Accordingly, when the filter element 1304 is received in an installed position within the housing 1204, air passing through the system 1200 (i.e., from the inlet opening 1208 to the outlet opening 1210) is forced to pass through the filter media 1308. Additionally, the upper seal 1318 also prevents dust buildup on the inside walls of the housing 1204 during operation.

The upper seal 1318 is compressed by an axial sealing force. The force of the upper member 1202 pressing down on the filter element 1304 when the filter element 1304 is received within the housing 1204 assists in creating the upper seal. In some arrangements, the compression distance for the upper seal 1318 caused by the upper member 1202 is limited to approximately fifteen to forty percent of the upper seal 1318. However, because the upper seal is created with an axial sealing force, the pressure differential caused by the filter element between the inlet face 1310 and the outlet face 1312 also assists in pressing the upper seal 1318 against the housing 1204. Accordingly, if a technician does not fully tighten the upper member 1202 onto the housing 1204, normal operational forces caused by the air pressure differential across the filter element 1204 are sufficient to create the upper seal.

In some arrangements, the filter element 1304 includes a lower support ring 1320. The lower support ring 1320 circumscribes the filter media 1308 adjacent the outlet face 1312. The lower support ring 1320 may be plastic, a polymer, or the like. In some arrangements, the lower support ring 1320 is secured to the filter media 1308 with an adhesive. In other arrangements, the lower support ring 1320 is secured to the filter media 1308 with a friction fit. The lower support ring includes a lower support element 1322. The lower support element 1322 may be an annular support element comprised of a porous and deformable material. In some arrangements, the lower support element is a permeable media gasket. In some arrangements, the lower support element 1322 is comprised of an open foam, a lofty meltblown permeable media, or felt. When the filter element 1304 is received within the housing 1204 in an installed position, the lower support element 1322 rests against an angled surface 1324 of the housing 1204. In some arrangements, attachment of the upper member 1202 to the housing 1204 compresses the lower support element 1322 against the angled surface 224 when the filter element 1304 is received within the housing 1204 in an installed position. The lower support element 1322 helps position and secure the filter element 1304 during installation of the filter element 1304 into the housing 1204. After installation into the installed position, the lower support element 1322 helps to retain the filter element 1304 in the installed position and helps to reduce vibration of the filter element 1304 during use. Further, the lower support element 1322 reduces the risk of the filter element 1304 vibrating against the housing 1204, referred to as "chatter," during use of the filter element 1304. Additionally, the lower support element 1322 significantly reduces the surface friction between the filter element 1304 and the housing 1204 over a polyurethane seal. In some arrangements, the lower support ring 1320 does not include a lower support element 1322. In such arrangements, the upper seal 1318 is the primary support surface between the housing 1204 and the filter element 1304 when the filter element 1304 is received in the housing 1204. In other arrangements, the filter element does not include a lower support ring 1320.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims. The term "approximately" when used with respect to values means plus or minus five percent of the associated value.

References herein to the positions of elements (e.g., "top," "bottom," "above," "below," etc.) are merely used to describe the orientation of various elements in the FIGURES. It should be noted that the orientation of various elements may differ according to other example embodiments, and that such variations are intended to be encompassed by the present disclosure.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. Filter media comprising:
   a first sheet of filter media having a first side and a second side and pleated along a plurality of bend lines to form a plurality of wall segments;
   the plurality of wall segments comprising a first set of wall segments alternately sealed to each other at the first side to define:
   a first set of tetrahedron channels having open first ends, and
   a second set of tetrahedron channels interdigitated with the first set of tetrahedron channels and having closed first ends;
   the plurality of wall segments comprising a second set of wall segments alternately sealed to each other at the second side to define:
   a third set of tetrahedron channels having closed second ends, and
   a fourth set of tetrahedron channels interdigitated with the third set of tetrahedron channels and having open second ends;

a second sheet of filter media extending across the first sheet of filter media, the second sheet of filter media comprises a plurality of embossments arranged in an interrupted straight line pattern, each of the plurality of embossments forming a raised surface configured to maintain a separation distance between the second sheet of filter media and an adjacent sheet of filter media, the plurality of embossments arranged at an angle Φ with respect to an X-Y axis that defines a plane of the second sheet of filter media, wherein the angle Φ is between 0 and 60 degrees relative to a lateral direction.

2. The filter media of claim 1, wherein the plurality of embossments are is arranged to interact with a peak of a tetrahedron flow channel of the adjacent sheet of filter media.

3. The filter media of claim 1, wherein the first side comprises an upstream inlet configured to receive fluid to be filtered, and wherein the second side comprises a downstream outlet configured to output filtered fluid.

4. The filter media of claim 1, wherein the second side comprises an upstream inlet configured to receive fluid to be filtered, and wherein the first side comprises a downstream outlet configured to output filtered fluid.

5. The filter media of claim 1, wherein the plurality of embossments are linear in shape.

6. The filter media of claim 1, wherein the plurality of embossments extend in a direction that is non-perpendicular to an axis defined by a bend line of the plurality of bend lines.

7. The filter media of claim 1, wherein the first side comprises a substantially v-shaped inlet, a v-shaped inlet height being the distance from a lower end of the v-shaped inlet to an upper end of the v-shaped inlet, along an axis that is substantially perpendicular to a longitudinal length of the filter media.

8. The filter media of claim 1, wherein the second sheet of filter media extends laterally across the plurality of bend lines from the first side to the second side.

9. The filter media of claim 1, wherein the plurality of embossments form a lowered surface corresponding to the raised surface, the lowered surface configured to maintain a gap between the second sheet of filter media and an adjacent sheet of filter media.

10. A filter element comprising the filter media of claim 1.

11. The filtration system of claim 1, wherein the angle Φ is between 35 and 55 degrees relative to the lateral direction.

12. The filtration system of claim 11, wherein the angle Φ is 45 degrees relative to the lateral direction.

13. A filtration system comprising:
a housing body, the housing body comprising:
a housing outlet, a housing inlet, and a central compartment; and
a filter element installed in the central compartment, the filter element comprising filter media, the filter media comprising:
a first sheet of filter media having an upstream inlet adjacent to the housing inlet and a downstream outlet adjacent the housing outlet, and pleated along a plurality of bend lines to form a plurality of wall segments;
the plurality of wall segments comprising a first set of wall segments alternately sealed to each other at the upstream inlet to define:
a first set of tetrahedron channels having open upstream ends, and
a second set of tetrahedron channels interdigitated with the first set of tetrahedron channels and having closed upstream ends;
the plurality of wall segments comprising a second set of wall segments alternately sealed to each other at the downstream outlet to define:
a third set of tetrahedron channels having open downstream ends, and
a fourth set of tetrahedron channels interdigitated with the third set of tetrahedron channels and having closed downstream ends;
a second sheet of filter media extending across the first sheet of filter media, the second sheet of filter media comprises a plurality of embossments arranged in an interrupted straight line pattern, each of the plurality of embossments forming a raised surface configured to maintain a separation distance between the second sheet of filter media and an adjacent sheet of filter media, the plurality of embossments arranged at an angle Φ with respect to an X-Y axis that defines a plane of the second sheet of filter media, wherein the angle Φ is between 0 and 60 degrees relative to a lateral direction.

14. The filtration system of claim 13, further comprising:
an upper member removably secured to the housing body, the upper member comprising an inlet opening aligned with the housing inlet, wherein a portion of the filter element contacts the upper member.

15. The filtration system of claim 13, further comprising:
an upper support ring coupled to a first side of the filter media, the upper support ring circumscribing the filter media adjacent the first side.

16. The filter media of claim 13, wherein the angle Φ is between 35 and 55 degrees relative to the lateral direction.

17. The filter media of claim 16, wherein the angle Φ is 45 degrees relative to the lateral direction.

* * * * *